(12) United States Patent
Naslavsky et al.

(10) Patent No.: US 12,406,489 B2
(45) Date of Patent: Sep. 2, 2025

(54) SYSTEM AND METHOD FOR AUTOMATIC DETECTION OF VISUAL EVENTS IN TRANSPORTATION ENVIRONMENTS

(71) Applicant: ShipIn Systems Inc., Newton, MA (US)

(72) Inventors: Ilan Naslavsky, Newton, MA (US); Aditya Gupte, Cambridge, MA (US); Moran Cohen, Jerusalem (IL); David J. Michael, Waban, MA (US)

(73) Assignee: ShipIn Systems Inc., Newton, MA (US)

( * ) Notice: Subject to any disclaimer, the term of this patent is extended or adjusted under 35 U.S.C. 154(b) by 338 days.

(21) Appl. No.: 17/873,053

(22) Filed: Jul. 25, 2022

(65) Prior Publication Data
US 2023/0040565 A1  Feb. 9, 2023

Related U.S. Application Data

(60) Provisional application No. 63/225,652, filed on Jul. 26, 2021.

(51) Int. Cl.
*G06V 10/94* (2022.01)
*G06V 10/25* (2022.01)
(Continued)

(52) U.S. Cl.
CPC .............. *G06V 10/94* (2022.01); *G06V 10/25* (2022.01); *G06V 10/765* (2022.01); *G06V 10/774* (2022.01); *G06V 10/82* (2022.01)

(58) Field of Classification Search
None
See application file for complete search history.

(56) References Cited

U.S. PATENT DOCUMENTS

| 9,106,810 B1 | 8/2015 | Hadsall, Sr. |
| 9,996,749 B2 | 6/2018 | Bataller |
| (Continued) | | |

FOREIGN PATENT DOCUMENTS

| CN | 109819393 A | 5/2019 |
| CN | 110363463 A | 10/2019 |
| (Continued) | | |

OTHER PUBLICATIONS

Qiao Dalei et al. "Marine Vision-Based Situational Awareness Using Discriminative Deep Learning: A Survey", Journal of Marine Science and Engineering, vol. 9, No. 4, Apr. 8, 2021, pp. 1-18, XP055929236, DOI: 10.3390/imse9040397 abstract.

(Continued)

*Primary Examiner* — Mark R Milia
(74) *Attorney, Agent, or Firm* — Loginov & Associates, PLLC; William A. Loginov

(57) ABSTRACT

This invention provides a system and method that uses a hybrid model for transportation-based (e.g. maritime) visual event detection of events. In operation, video data is reduced by detecting change and exclusively transmitting images to the deep learning model when changes are detected, or alternatively, based upon a timer that samples at selected intervals. Relatively straightforward deep learning models are used, which operate on sparse individual frames, instead of employing complex deep learning models that operate on multiple frames/videos. This approach reduces the need for specialized models. Independent, rule-based classifiers are used, based on the output of the deep learning model into visual events that, in turn, allows highly specialized events to be constructed. For example, multiple detections can be combined into higher-level single events, and thus, the existence maintenance procedures, cargo activities, and/or (Continued)

inspection rounds can be derived from combining multiple events or multiple detections.

25 Claims, 16 Drawing Sheets

(51) Int. Cl.
*G06V 10/764* (2022.01)
*G06V 10/774* (2022.01)
*G06V 10/82* (2022.01)

(56) References Cited

U.S. PATENT DOCUMENTS

| | | |
|---|---|---|
| 10,936,907 B2 | 3/2021 | Suresh |
| 11,132,552 B1 | 9/2021 | Naslavsky |
| 2002/0075546 A1 | 6/2002 | Webb |
| 2003/0025599 A1 | 2/2003 | Monroe |
| 2004/0008253 A1 | 1/2004 | Monroe |
| 2005/0055330 A1 | 3/2005 | Britton |
| 2007/0260363 A1 | 11/2007 | Miller |
| 2009/0102950 A1 | 4/2009 | Ahiska |
| 2011/0257819 A1 | 10/2011 | Chen |
| 2014/0059468 A1 | 2/2014 | Allgair |
| 2017/0140603 A1 | 5/2017 | Ricci |
| 2018/0239948 A1 | 8/2018 | Rutschman |
| 2018/0239982 A1 | 8/2018 | Rutschman |
| 2018/0356231 A1 | 12/2018 | Steffens |
| 2020/0012283 A1 | 1/2020 | Nguyen |
| 2020/0064466 A1 | 2/2020 | Harper |
| 2020/0089993 A1* | 3/2020 | Hollander ............. G06N 3/045 |
| 2020/0184828 A1 | 6/2020 | Mazor |
| 2020/0264268 A1 | 8/2020 | Moore |
| 2020/0327345 A1 | 10/2020 | Schumacher |
| 2021/0174952 A1 | 6/2021 | Leong |
| 2022/0144392 A1 | 5/2022 | Raviv |
| 2022/0253763 A1 | 8/2022 | Dividino |
| 2022/0261483 A1 | 8/2022 | Tam |
| 2022/0396340 A1 | 12/2022 | Delfs |

FOREIGN PATENT DOCUMENTS

| | | |
|---|---|---|
| CN | 210464459 | 5/2020 |
| GB | 2609530 A | 2/2023 |
| GB | 2609560 | 2/2023 |
| KR | 20130137876 | 12/2013 |
| KR | 101993138 | 6/2019 |
| KR | 20210019862 | 2/2021 |
| KR | 102320142 B1 | 11/2021 |
| KR | 1020220062162 | 5/2022 |
| WO | 2022269609 | 12/2022 |

OTHER PUBLICATIONS

Shanshan Zhou et al. "Deep Optical Flow Estimation Via Multi-Scale Correspondence Structure Learning", Arxiv.org, Cornell University Library, 201 Olin Library Cornell University Ithaca, NY 14853, Jul. 23, 2017, XP080778867, DOI : 10.24963/IJCAI.2017/488, abstract; figure 2.

Survey of Cutting-edge Computer Vision Papers—Human Recognition, May 15, 2019, Hiroto Honda, https://engineering.dena.com/blog/2019/05/survey-of-cutting-edge-computer-vision-papers-human-recognition/, Accessed Jul. 26, 2022.

Bloomfield, Nathaniel J., et al. "Automating the assessment of biofouling in images using expert agreement as a gold standard." Scientific Reports 11.1 (2021): 2739 [online], [retrieved on May 18, 2023]. Retrieved from the Internet <https://arxiv.org/pdf/2008.09289.pdf> (Year: 2021).

Ilan Naslavsky, U.S. Appl. No. 17/873,053, entitled System and Method for Automatic Detection of Visual Events in Transportation Environments, filed Jul. 25, 2022.

Translated Version of CN210464459 (Year: 2020).

* cited by examiner

SYSTEM AND METHOD FOR AUTOMATIC DETECTION OF VISUAL EVENTS IN TRANSPORTATION ENVIRONMENTS

RELATED APPLICATION

This application claims the benefit of U.S. Provisional Application Ser. No. 63/225,652, entitled SYSTEM AND METHOD FOR AUTOMATIC DETECTION OF VISUAL EVENTS IN TRANSPORTATION ENVIRONMENTS, filed Jul. 26, 2021, the teachings of which are expressly incorporated herein by reference.

FIELD OF THE INVENTION

This application relates to systems and methods for detecting and communicating visual data and related events in a transportation environment

BACKGROUND OF THE INVENTION

International shipping is a critical part of the world economy. Ocean-going, merchant freight vessels are employed to carry virtually all goods and materials between ports and nations. The current approach to goods shipments employs intermodal cargo containers, which are loaded and unloaded from the deck of ships, and are carried in a stacked configuration. Freight is also shipped in bulk carriers (e.g. grain) or liquid tankers (e.g. oil). The operation of merchant vessels can be hazardous and safety concerns are always present. Likewise, passenger vessels, with the precious human cargo are equally, if not more, concerned with safety of operations and adherences to rules and regulations by crew and passengers. Knowledge of the current status of the vessel, crew and cargo can be highly useful in ensuring safe and efficient operation.

Commonly assigned, U.S. patent application Ser. No. 17/175,364, entitled SYSTEM AND METHOD FOR BANDWIDTH REDUCTION AND COMMUNICATION OF VISUAL EVENTS, filed Feb. 12, 2021, by Ilan Naslavsky, et al, teaches a system and method that addresses problems of bandwidth limitations in certain remote transportation environments, such as ships at sea, and is incorporated herein by reference as useful background information. According to this system and method, while it is desirable in many areas of commercial and/or government activity to enable visual monitoring (manual and automated surveillance), with visual and other status sensors to ensure safe and rule-conforming operation, these approaches entail the generation and transmission of large volumes of data to a local or remote location, where such data is stored and/or analyzed by management personnel. Unlike most land-based (i.e. wired, fiber or high-bandwidth wireless) communication links, it is often much more challenging to transmit useful data (e.g. visual information) from ship-to-shore. The incorporated U.S. application teaches a system and method that enables continuous visibility into the shipboard activities, shipboard behavior, and shipboard status of an at-sea commercial merchant vessel (cargo, fishing, industrial, and passenger). It allows the transmitted visual data and associated status be accessible via an interface that aids users in manipulating, organizing and acting upon such information.

One aspect of the incorporated application is use of event detectors to determine when particular activities are taking place. An operational challenge is to automatically detect maritime visual events onboard a commercial vessel at a reasonable computational cost and reasonable development cost. A detected maritime visual event could be a visual event among the categories of crew behavior, crew safety, ship maintenance, ship environment, and active cargo monitoring. One option for automatically detecting maritime visual events is to create separate specific visual deep learning models unique to each event type with each event type having its own unique network topology, training hyperparameters, and training data set. Typically, each such specific deep learning model would require 10,000's of representative labelled image examples for training, testing and validation. Collecting, curating, and labelling this set of labelled examples is a large task, time consuming, and with high development costs. Developing, training and testing an appropriate network topology also has high development costs. Once the model is developed and trained, it needs to be deployed. A deployed deep learning model like this running at video frame rates (15-60 fps) typically requires 4-10 GB of memory on a high-end computer with 8 GPU's. This high-end computer with 8 GPU's represents a significant deployment cost. Similar maritime visual events can be trained on the same network and deployed simultaneously using the same computer hardware (as long as 10,000's of representative labelled image examples are available for each similar maritime visual event). But different event types such as those events that require understanding person/object interactions, temporal or spatial activities, or human activity cues require different network topologies and separate additional deployments with additional high-end computers and additional GPU's. Supporting different event types thus greatly increases the cost as the number and type of alerts increases.

Another alternative architecture for solving maritime visual event detection is to avoid deep learning models, and instead directly code the machine vision algorithms in a high-level language. This has the disadvantage of long development time (writing 100,000's of lines of code), less flexibility, and potentially worse event detection performance, with the advantage of lower computational cost and less expensive deployment.

Hence, it is desirable to provide a visual detection system and method that reduces voluminous data and complexity of a deep learning system, and does not require the intense, time-consuming coding typically necessitated required of traditional machine vision algorithms.

SUMMARY OF THE INVENTION

This invention overcomes disadvantages of the prior art by providing a system and method that effectively reimagines specific visual deep learning models as a combination of at least three parts and/or functional modules that, when integrated and deployed, produce sums requiring less computation, memory, training and development time. The combination of at least three functional modules provides a hybrid model for transportation-based (e.g. maritime) visual event detection. In operation, video data is reduced by approximately one-thousand times (1,000×), or more, by detecting change and exclusively transmitting images to the deep learning model when changes are detected, or alternatively, based upon a timer that samples every selected time interval (e.g. 20 to 30 seconds). The system and method can employ relatively straightforward deep learning model(s), which operate on sparse individual frames, instead of employing complex deep learning models that operate on multiple frames or videos. This approach reduces the need for specialized models. Additionally, the system and method allows constriction of independent rule-based classifiers based on the output of the deep learning model into visual events that, in turn, allows highly specialized events to be constructed. For example, multiple detections can be combined into higher-level single events, and thus, the existence of maintenance procedures, cargo activities, and/or inspection rounds can be derived from combining multiple events or multiple detections.

In an illustrative embodiment, a system and method is provided for detecting visual events in a transportation environment. having one or more locations of interest in which the events occur. A plurality of cameras are arranged to image each of a plurality of activities relevant to the transportation environment, in which each camera of the plurality of cameras respectively acquires images of a location of interest and transmits image data thereof to a processor. A visual detector is associated with the processor arranged to include, (a) at least one visual change detector that identifies changes between at least two of the images, (b) at least one pre-trained visual deep learning model operating on the images and generates a deep learning inference output, and (c) at least one rule-based classifier that produces events or alerts from the deep learning inference output run on images trained with at least one rule. Illustratively, the processor comprises one or more CPUs or one or more GPUs. The visual change detector can include at least one of a data filter, an optical flow processor or image differencer block, and a sum or max threshold operator. The optical flow processor or image difference can operate at multiple scales. The visual detector can operate on image sequences with or free-of activity. The visual change detector can be adapted to operate based upon a change in brightness, a threshold of object size, a threshold of texture or a threshold of object velocity. The deep learning model comprises at least one of a single stage detector, YOLO, SSD, a multistage detector, RCNN, FasterRCNN, a segmentation network, MaskRCNN, a segmentation network from an open source library, and a segmentation network from at least one of OpenCV and Detectron2—among other possible implementations that should be clear to those of skill. The deep learning model can be adapted to operate based upon at least one of a deep learning and machine learning framework, Cafe, Tensorflow, Pytorch, and Keras—among other implementations that should be clear to those of skill. Illustratively, the rule-based classifier operates based upon at least one of an event sequence description, a person or object predicate, a person or object location, a person or object pose, and a labelled image region. The rule-based classifier can operate on stored temporal and spatial partial events to generate a complete visual event. The visual change detector can include a clock output and/or an external trigger and a timer that provides image frames to downstream detection processes based upon a predetermined time interval. The rule-based classifier can receive regions of interest of the scene as an input. Further, the rule-based classifier can be based upon a detected and localized person, a region of interest and an event sequence. At least one of, (a) the person is a crew on a vessel, (b) the region of interest is a location on the vessel, and (c) the event sequence, can be an operation related to the vessel—in a maritime environment. The cameras and the visual detector can be arranged to determine a present time and location of the vessel and compare the time and location to detection of lighting so as to alert of improper lighting at the time and location—for example, running lighting while at sea in a nighttime environment, where such can be hazardous.

BRIEF DESCRIPTION OF THE DRAWINGS

The invention description below refers to the accompanying drawings, of which.

DETAILED DESCRIPTION

I. System Overview

Reference is made to the above-incorporated U.S. patent application Ser. No. 17/175,364, which, by way of background depicts the system of FIGS. 1 and 1A. By way of further background, these show an exemplary arrangement 100, in which the system and method herein can operate, which enables tracking and reporting upon visual, and other, events generated by visual sensors aboard ship that create video data streams, visual detection of events aboard ship based on those video data streams, aggregation of those visual detections aboard ship, prioritization and queuing of the aggregated detections into events, bandwidth reduction of the video data streams in combination with the aggregated events, sending the events over the reduced bandwidth communications channel to shore, reporting the events to a user-interface on shore, and further aggregation of the events from multiple ships and multiple time periods into a fleet-wide aggregation that can present information over time. The system and method herein further provides the ability to configure and setup the system described above to select or not select events for presentation in order to reduce confusion for the person viewing the dashboard as well as to set the priority for communicating particular events or classes of events over the reduced bandwidth communications channel so that the most important events are communicated at the expense of less important events.

Figure 1:
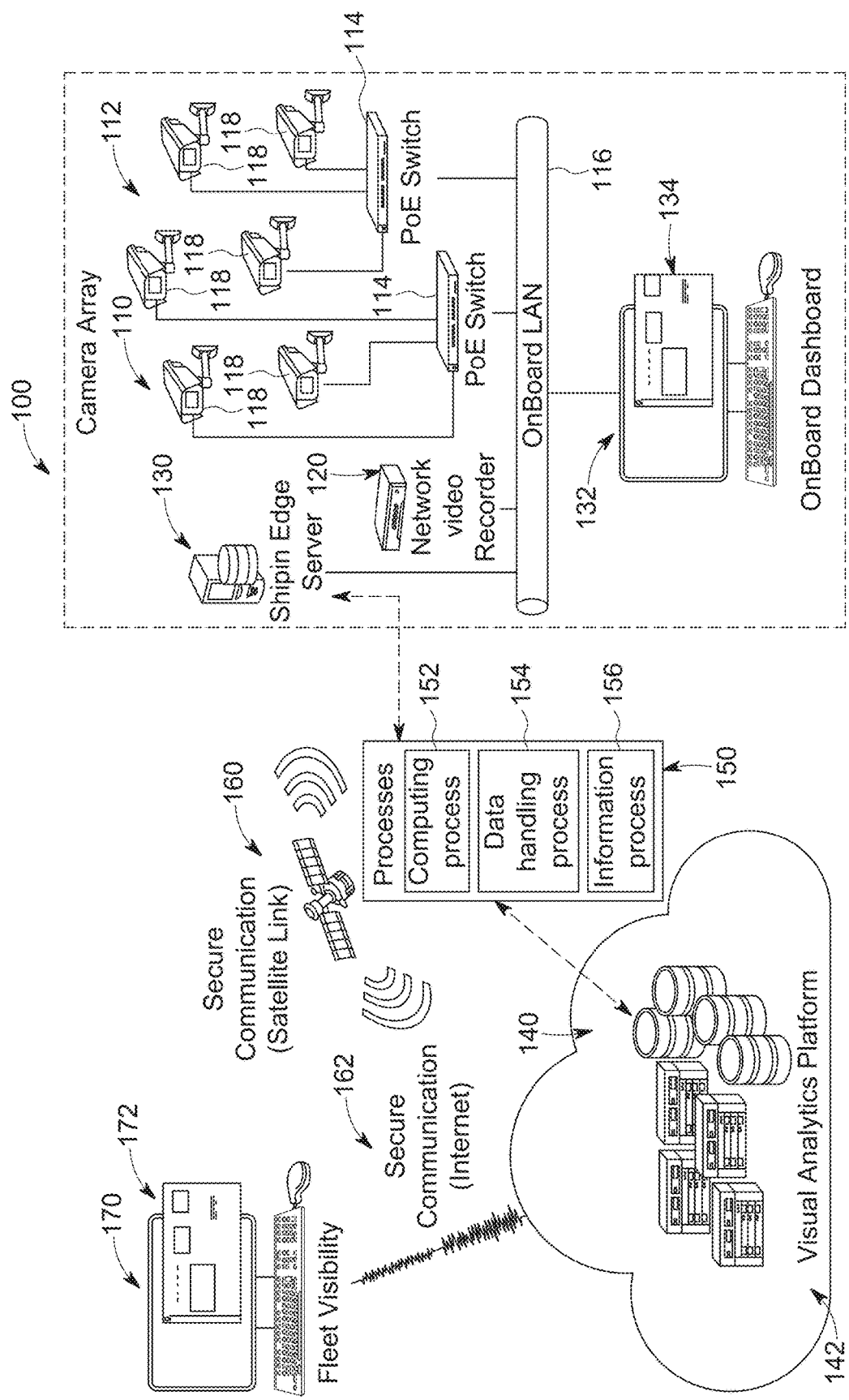
FIG. 1 is a diagram showing an overview of a system and associated method for acquiring, transmitting analyzing and reporting visual and other sensor information with respect to a communication link typically characterized by reduced bandwidth according to an illustrative embodiment.

FIG. 1, the arrangement 100 particularly depicts a shipboard location 110 includes a camera (visual sensor) array 112 comprising a plurality of discrete cameras 118 (and/or other appropriate environmental/event-driven sensors) that are connected to wired and/or wireless communication links (e.g. that are part of a TCP/IP LAN or other protocol-driven data transmission network 116) via one or more switches, routers, etc. 114. Image (and other) data from the (camera) sensors 118 is transmitted via the network 116. Note that cameras can provide analog or other format image data to a remote receiver that generates digitized data packets for use of the network 116. The cameras 118 can comprise conventional machine vision cameras or sensors operating to collect raw video or digital image data, which can be based upon two-dimensional (2D) and/or three-dimensional (3D) imaging. Furthermore, the image information can be grayscale (monochrome), color, and/or near-visible (e.g. infrared (IR)). Likewise, other forms of event-based cameras can be employed.

Note that data used herein can include both direct feeds from appropriate sensors and also data feeds from other data sources that can aggregate various information, telemetry, etc. For example, location and/or directional information can be obtained from navigation systems (GPS etc.) or other systems (e.g. via APIs) through associated data processing devices (e.g. computers) that are networked with a server 130 for the system. Similarly, crew members can input information via an appropriate user interface. The interface can request specific inputs—for example logging into or out of a shift, providing health information, etc.—or the interface can search for information that is otherwise input by crew during their normal operations—for example, determining when a crew member is entering data in the normal course of shipboard operations to ensure proper procedures are being attended to in a timely manner.

The shipboard location 110 can further include a local image/other data recorder 120. The recorder can be a stand-alone unit, or part of a broader computer server arrangement 130 with appropriate processor(s), data storage and network interfaces. The server 130 can perform generalized shipboard, or be dedicated to, operations of the system and method herein with appropriate software. The server 130 communicates with a work station or other computing device 132 that can include an appropriate display (e.g. a touchscreen) 134 and other components that provide a graphical user interface (GUI). The GUI provides a user on board the vessel with a local dashboard for viewing and controlling manipulation of event data generated by the sensors 118 as described further below. Note that display and manipulation of data can include, but is not limited to enrichment of the displayed data (e.g. images, video, etc.) with labels, comments, flags, highlights, and the like.

The information handled and/or displayed by the interface can include a workflow provided between one or more users or vessels. Such a workflow would be a business process where information is transferred from user to user (at shore or at sea interacting with the application over the GUI) for action according to the business procedures/rules/policies. This workflow automation is commonly referred to as "robotic process automation."

The processes 150 that run the dashboard and other data-handling operations in the system and method can be performed in whole or in part with the on-board server 130, and/or using a remote computing (server) platform 140 that is part of a land-based, or other generally fixed, location with sufficient computing/bandwidth resources (a base location 142). The processes can generally include 150 a computation process 152 that handles sensor data to meaningful events. This can include machine vision algorithms and similar procedures. A data-handling process 154 can be used to derive events and associated status based upon the events—for example movements of the crew and equipment, cargo handling, etc. An information process 156 can be used to drive dashboards for one or more vessels and provide both status and manipulation of data for a user on the ship and at the base location.

Data is communicated between the ship (or other remote location) 110 and the base 142 and occurs over one or more reduced-bandwidth wireless channels, which can be facilitated by a satellite uplink/downlink 160, or another transmission modality—for example, long-wavelength, over-air transmission. Moreover, other forms of wireless communication can be employed such as mesh networks and/or underwater communication (for example long-range, sound-based communication and/or VLF). Note that when the ship is located near a land-based high-bandwidth channel or physically connected by-wire while at port, the system and method herein can be adapted to utilize that high-bandwidth channel to send all previously unsent low-priority events, alerts, and/or image-based information.

The (shore) base server environment 140 communicates via an appropriate, secure and/or encrypted link (e.g. a LAN or WAN (Internet)) 162 with a user workstation 170 that can comprise a computing device with an appropriate GUI arrangement, which defines a user dashboard 172 allowing for monitoring and manipulation of one or more vessels in a fleet over which the user is responsible and manages.

Figure 1A:
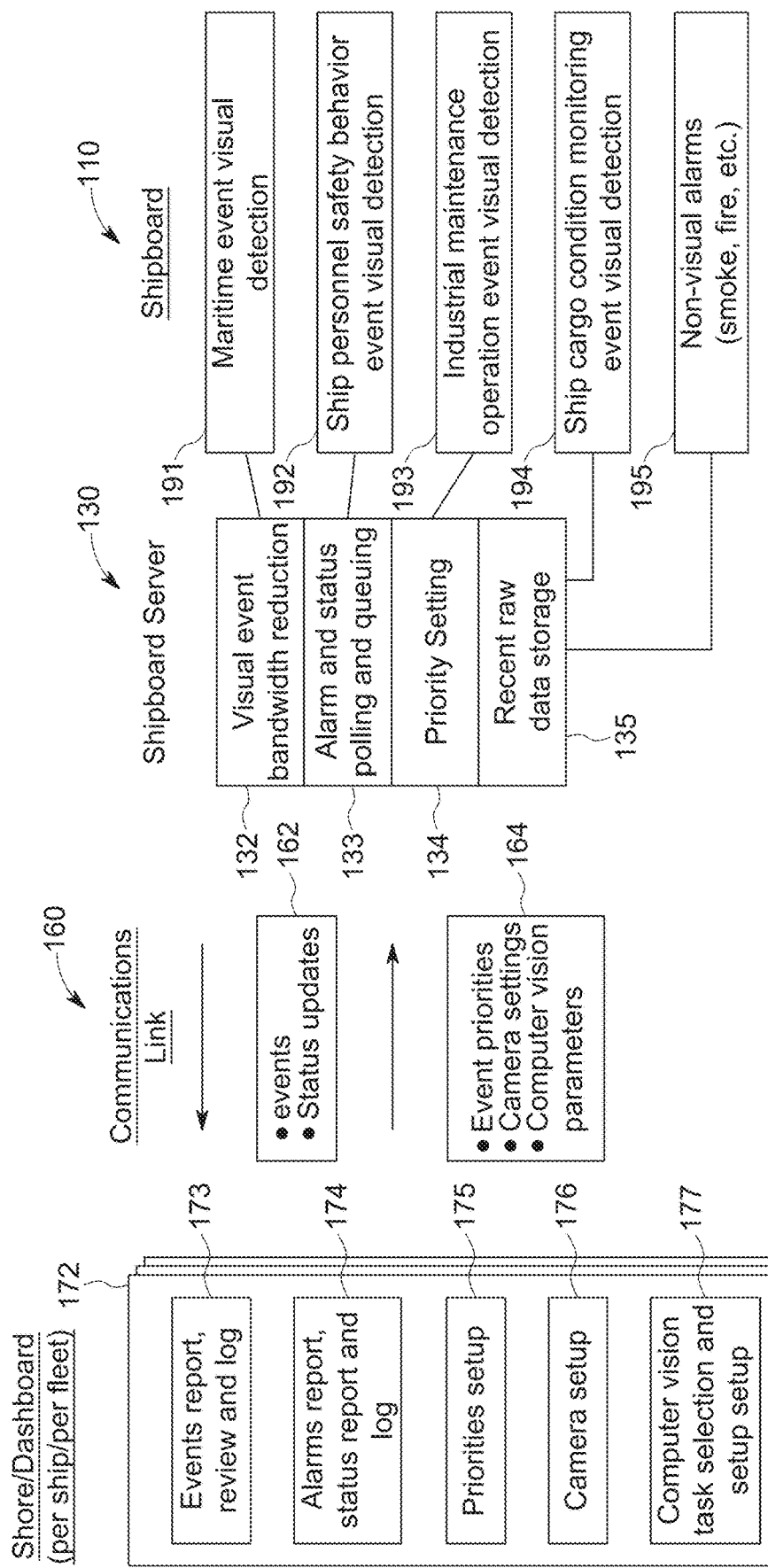
FIG. 1A is a block diagram showing data and operations employed by the system and method of FIG. 1.
Figure 1B:
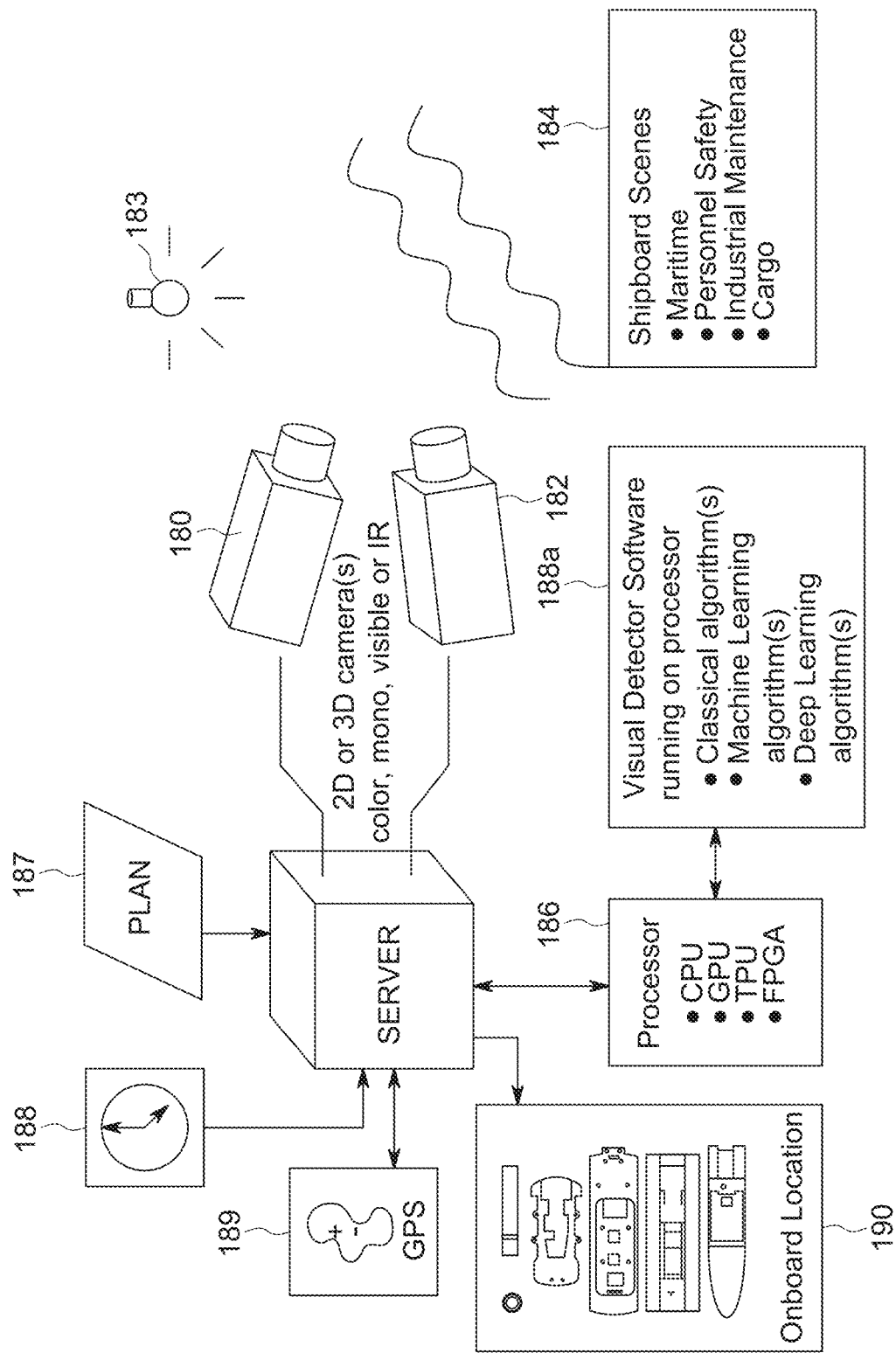
FIG. 1B is a diagram showing acquisition of images and other data for expected event detection according to the system and method of FIG. 1.

Referring further to FIG. 1A, the data handled by the system is shown in further detail. The data acquired aboard the vessel environment 110, and provided to the server 130 can include a plurality of possible, detected visual (and other sensor-based) events. These events can be generated by action of software and/or hardware based detectors that analyze visual images and/or time-sequences of images acquired by the cameras. With further reference to FIG. 1B, visual detection is facilitated by a plurality of 2D and/or 3D camera assemblies depicted as cameras 180 and 182 using ambient or secondary sources of illumination 183 (visible and/or IR). The camera assemblies image scenes 184 located on board (e.g.) a ship. The scenes can relate to, among other subjects, maritime events, personnel safety and/or cargo. The images are directed as image data to the event detection server or processor 186 that also receives inputs from a plan or program 187 that characterizes events and event detection and a clock 188 that establishes a timeline and timestamp for received images. The event detection server or processor 186 can also receive inputs from a GPS receiver 189 to stamp the position of the ship at the time of the event and can also receive input from an architectural plan 190 of the vessel (that maps onboard locations on various decks) to stamp the position of the sensor within the vessel that sent the input. The event server/processor 186 can comprise one or more types and/or architectures of processor(s), including, but not limited to, a central processing unit (CPU—for example one or more processing cores and associated computation units), a graphical processing unit (GPU—operating on a SIMD or similar arrangement), tensor processing unit (TPU) and/or field programmable gate array (FPGA—having a generalized or customized architecture).

Referring again to FIG. 1A, the base location dashboard 172 is established on a per-ship and/or per fleet basis and communicates with the shipboard server 130 over the communications link 160 in a manner that is typically reduced in bandwidth, and possibly intermittent in performing data transfer operations. The link 160 transmits events and status updates 162 from the shipboard server 130 to the dashboard 172 and event priorities, camera settings and vision system parameters 164 from the dashboard 172 to the shipboard server. More particularly, the dashboard displays and allows manipulation of events reports and logs 173, alarm reports and logs 174, priorities for events, etc. 175, camera setup 176 and vision system task selection and setup relevant to event detection, etc. 177. The shipboard server 130 includes various functional modules, including visual event bandwidth reduction 132 that facilitates transmission over the link 160; alarm and status polling and queuing 133 that determines when alarms or various status items have occurred and transmits them in the appropriate priority order; priority setting 134 that selects the priorities for reporting and transmission; and a data storage that maintains image and other associated data from a predetermined time period 135.

Note that, in various embodiments, the bandwidth of the communications link between vessel and base can be limited by external systems such as QoS-quality of service-settings on routers/link OR by the internal system (edge server 130)—for example to limit usage to (e.g.) 15% of total available communication bandwidth. This limitation in bandwidth can be based on a variety of factors, including, but not limited to, the time of day and/or a communications satellite usage cost schedule. An appropriate instruction set can be programmed into the server using conventional or custom control processes. The specific settings for such bandwidth control can also be directed by the user via the GUI.

II. Visual Detectors

As shown in FIG. 1B, various imaged events are determined from acquired image data using appropriate processes/algorithms 188a performed by the processor(s) 186. These can include classical algorithms, which are part of a conventional vision system, such as those available from (e.g.) Keyence, Cognex Corporation, MVTec, or HIKVision. Alternatively, the classical vision system could be based on open source such as OpenCV. Such classical vision systems can include a variety of vision system tools, including, but not limited to, edge finders, blob analyzers, pattern recognition tools, etc. The processor(s) 186 can also employ machine learning algorithms or deep learning algorithms, which can be custom built or commercially available from a variety of sources, and employ appropriate deep-learning frameworks such as caffe, tensorflow, torch, keras and/or OpenCV. The networks can be multi-stage detectors (e.g. RCNN, FastRCNN, etc), single stage detectors (e.g. YOLOv3, SSD), segmentation networks (mask-RCNN). See also URL address https://engineer.dena.com/posts/2019.05/survey-of-cutting-edge-computer-vision-papers-human-recognition/on the WorldWideWeb.

As shown in FIG. 1A, the visual detectors relate to maritime events 191, ship personnel safety behavior and events 192, maintenance operation and events 193, ship cargo condition and events related thereto 194, and/or non-visual alarms 195, such as smoke, fire, and/or toxic gas detection via appropriate sensors. By way of non-limiting example, some particular detected events and associated detectors relate to the following:

(a) A person is present at their station at the expected time and reports the station, start time, end time, and elapsed time;

(b) A person has entered a location at the expected time and reports the location, start time, end time, and elapsed time;

(c) A person moved through a location at the expected time and reports the location, start time, end time, and elapsed time;

(d) A person is performing an expected activity at the expected location at the expected time and reports the location, start time, end time, and elapsed time—the activity can include (e.g.) watching, monitoring, installing, hose-connecting or disconnecting, crane operating, tying with ropes;

(e) a person is running, slipping, tripping, falling, lying down, using or not using handrails at a location at the expected time and reports the location, start time, end time, and elapsed time;

(f) A person is wearing or not wearing protective equipment when performing an expected activity at the expected location at the expected time and reports the location, start time, end time, and elapsed time—protective equipment can include (e.g.) a hard-hat, left or right glove, left or right shoe/boot, ear protection, safety goggles, life-jacket, gas mask, welding mask, or other protection;

(g) A door is open or closed at a location at the expected time and reports the location, start time, end time, and elapsed time;

(h) An object is present at a location at the expected time and reports the location, start time, end time and elapsed time—the object can include (e.g.) a gangway, hose, tool, rope, crane, boiler, pump, connector, solid, liquid, small boat and/or other unknown item;

(i) That normal operating activities are being performed using at least one of engines, cylinders, hose, tool, rope, crane, boiler, and/or pump; and (j) That required maintenance activities are being performed on engines, cylinders, boilers, cranes, steering mechanisms, HVAC, electrical, pipes/plumbing, and/or other systems.

Note that the above-recited listing of examples (a-j) are only some of a wide range of possible interactions that can form the basis of detectors according to illustrative embodiments herein. Those of skill should understand that other detectable events involving person-to-person, person-to-equipment or equipment-to-equipment interaction are expressly contemplated.

In operation, an expected event visual detector takes as input the detection result of one or more vision systems aboard the vessel. The result could be a detection, no detection, or an anomaly at the time of the expected event according to the plan. Multiple events or multiple detections can be combined into a higher-level single event. For example, maintenance procedures, cargo activities, or inspection rounds may result from combining multiple events or multiple detections. Note that each visual event is associated with a particular (or several) vision system camera(s) 118, 180, 182 at a particular time and the particular image or video sequence at a known location within the vessel. The associated video can be optionally sent or not sent with each event or alarm. When the video is sent with the event or alarm, it may be useful for later validation of the event or alarm. Notably, the discrete images and/or short-time video frame sequences actually represent a small fraction of the video stream, and consequently represent a substantial reduction in the bandwidth required for transmission in comparison to the entire video sequence over the reduced-bandwidth link. Moreover, in addition to compacting the video by reducing it to a few images or short-time sequence, the system can reduce the images in size either by cropping the images down to significant or meaningful image locations required by the detector or by reducing the resolution say from the equivalent of high-definition (HD) resolution to standard-definition (SD) resolution, or below standard resolution.

In addition to reducing bandwidth by identifying events via the vision system and cropping such images where appropriate, the number of image frames can be reduced, in a sequence thereof, by increasing the interval of time between frames. Moreover, bandwidth can be even further reduced using the procedures above, and then subjecting (all on the shipboard server side) the event-centric, cropped, spaced-apart, using commercially available or customized lossy or lossless image compression techniques. Such techniques can include, but are not limited to discrete cosine transform (DCT), run-length encoding (RLE), predictive coding, and/or Lempel-Ziv-Welch (LZW).

The images or video sequences NOT associated with visual events may be stored for some period of time on board the vessel.

The shipboard server establishes a priority of transmission for the processed visual events that is based upon settings provided from a user, typically operating the on-shore (base) dashboard. The shipboard server buffers these events in a queue in storage that can be ordered based upon the priority. Priority can be set based on a variety of factors—for example personnel safety and/or ship safety can have first priority and maintenance can have last priority, generally mapping to the urgency of such matters. By way of example, all events in the queue with highest priority are sent first. They are followed by events with lower priority. If a new event arrives shipboard with higher priority, then that new higher priority event will be sent ahead of lower priority events. It is contemplated that the lowest priority events can be dropped if higher priority events take all available bandwidth. The shipboard server receives acknowledgements from the base server on shore and confirms that events have been received and acknowledged on shore before marking the shipboard events as having been sent. Multiple events may be transmitted prior to receipt (or lack of receipt) of acknowledgement. Lack of acknowledgement potentially stalls the queue or requires retransmission of an event prior to transmitting all next events in the priority queue on the server. The shore-based server interface can configure or select the visual event detectors over the communications link. In addition to visual events, the system can transmit non-visual events like a fire alarm signal or smoke alarm signal.

Note that a single visual event detector may operate continuously, and receive input from a single video camera typically running at 15, 30 or 60 frames per second. A typical deployment may involve several or dozens of visual event detectors running on the input from several or dozens of video cameras. By way of example of such operation ten (10) channels of raw video data generate 5 Mb/s per HD video channel or 50 Mb/s in aggregate, which represents a substantial volume of input, and renders the use of bandwidth reduction, as described above, is highly desirable.

III. System Operation

Figure 1C:
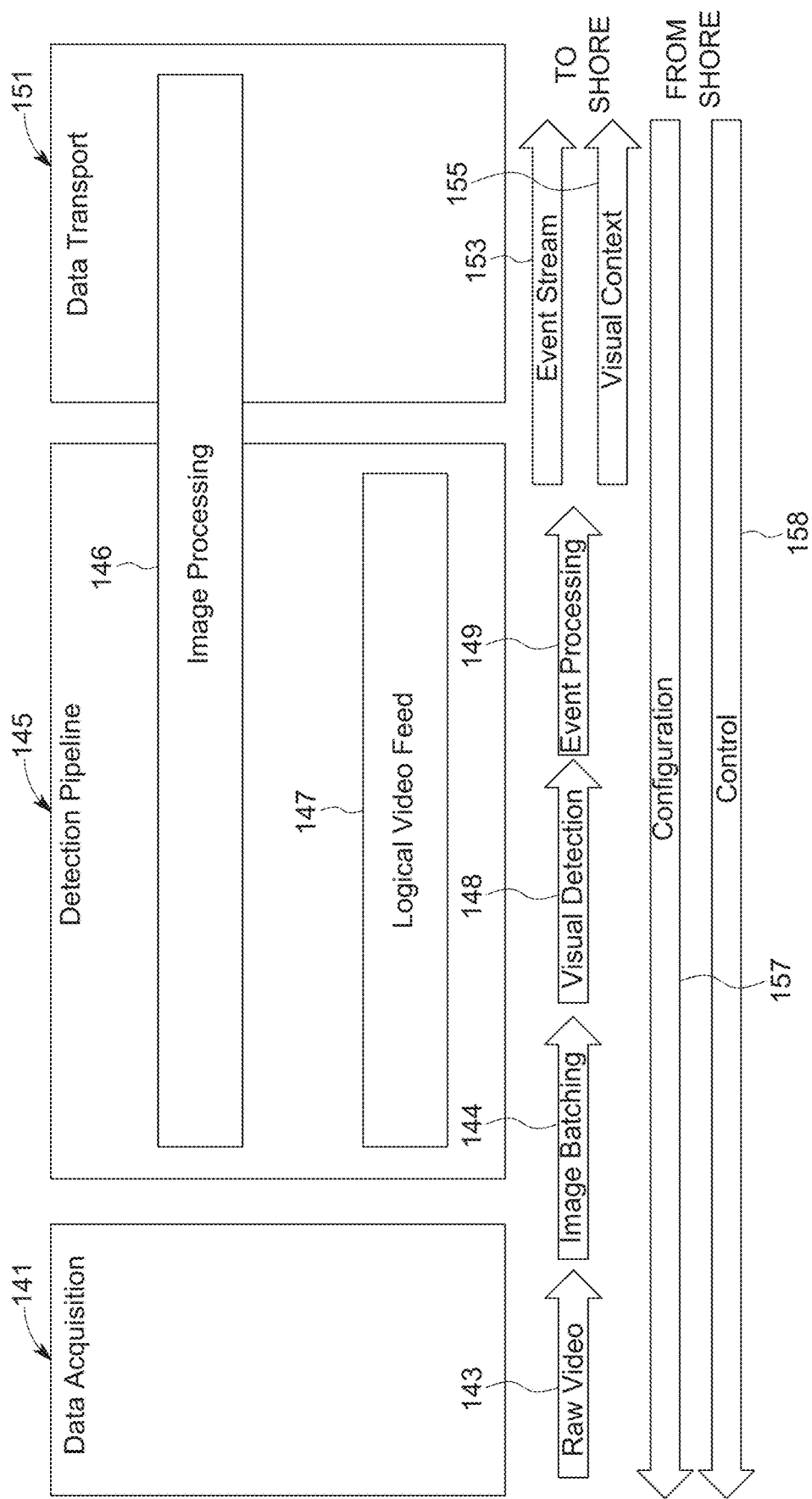
FIG. 1C is a block diagram showing a logical flow of operations according to the system and method herein, including novel, hybrid event detection as described herein.

With reference to FIG. 1C, the logical flow of operations according to the system and method is shown. Data, in the form of raw video 143, and other sensor-types is acquired in block 141. Images/sensor data is/are batched 144 and provided to the Detection Pipeline 145, according to this invention. This includes overall image processing functions 146 and logical video feed processes 147 that include visual detection 148 and event processing 149. Data transport processes in block 151 provide an event stream 153 and visual context 155 to a remote (e.g. shore-based) location via a (e.g.) reduced-bandwidth link. The remote location returns configuration 157 and control 158 data to the system as shown. The associated data acquisition 141, detection pipeline 145, and data transport 151 blocks are further depicted in FIG. 1D according to an event stream that runs (e.g.) from vessel to shore. A camera 159 and recorder 161 of any acceptable type are used to physically capture and store video and other sensor data in the acquisition block 141. The detection pipeline's (145) image processing flow 146 includes image ingestion 163, frame registration (register 165), visual detection processes 166 and a spatial process (or) 167. The associated logical video feed 147 includes a complex event processor 168, a policy and rules engine/process 169 and a sensor fusion/fusing process 171. Within the data transport block 151, the image processing flow further includes a context extraction process 178 and a visual context transport process 179. The transport block 151 further includes event transport processes ET and control CON processes.

Figure 1D:
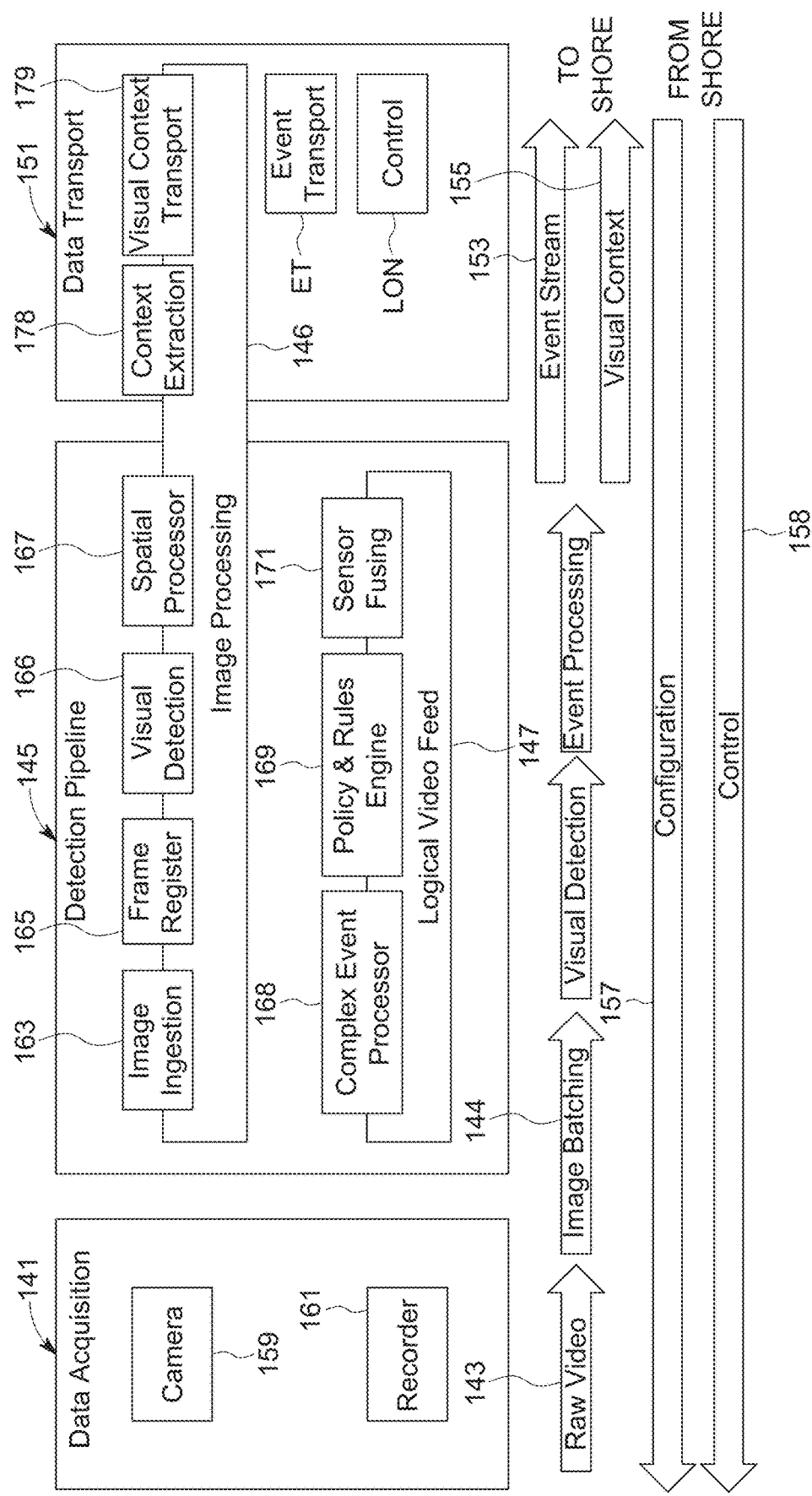
FIG. 1D is a block diagram showing the data acquisition, detection pipeline 145, and data transport processors/processes associated with the flow of FIG. 1C.
Figure 1E:
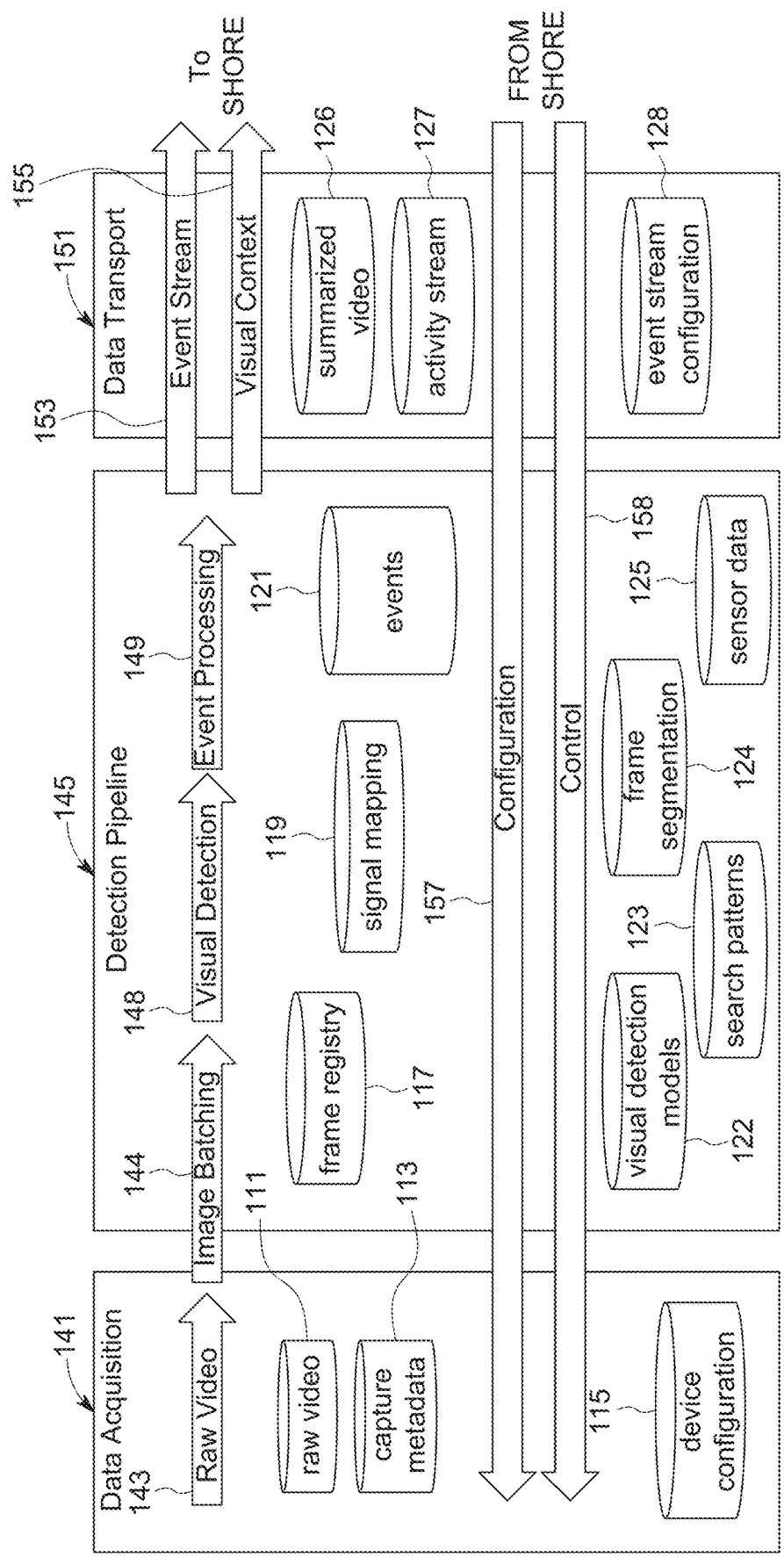
FIG. 1E is a visual logical summarization of the functions and processors/processes associated with the flow of FIG. 1C.

FIG. 1E depicts the data artifacts produced and/or consumed by the visual logical summarization process in the blocks 141, 145 and 151 described above. The overall data produced and or/consumed by the processes in the data acquisition block, include raw video 111 and metadata capture 113, as well as device configuration 115. The data produced and or/consumed by the processes of the detection pipeline 145 can include the frame registry 117, signal mapping 119 and events 121. Control and configuration data produced and or/consumed by the processes within the pipeline 145 can include visual detection models 122, search patterns 123, frame segmentation 124 and sensor data 125. Data produced and or/consumed by the data transport block 151 can include summarized video 126 and an activity stream 127. Similarly, an event stream configuration 128 is depicted for control/configuration processes. Note that the above-described exemplary arrangement of functional blocks is by way of non-limiting example to aid in understanding the concepts presented herein, and that alternate arrangements of functions and organizations thereof are expressly contemplated.

IV. Hybrid Event Detector

Figure 2:
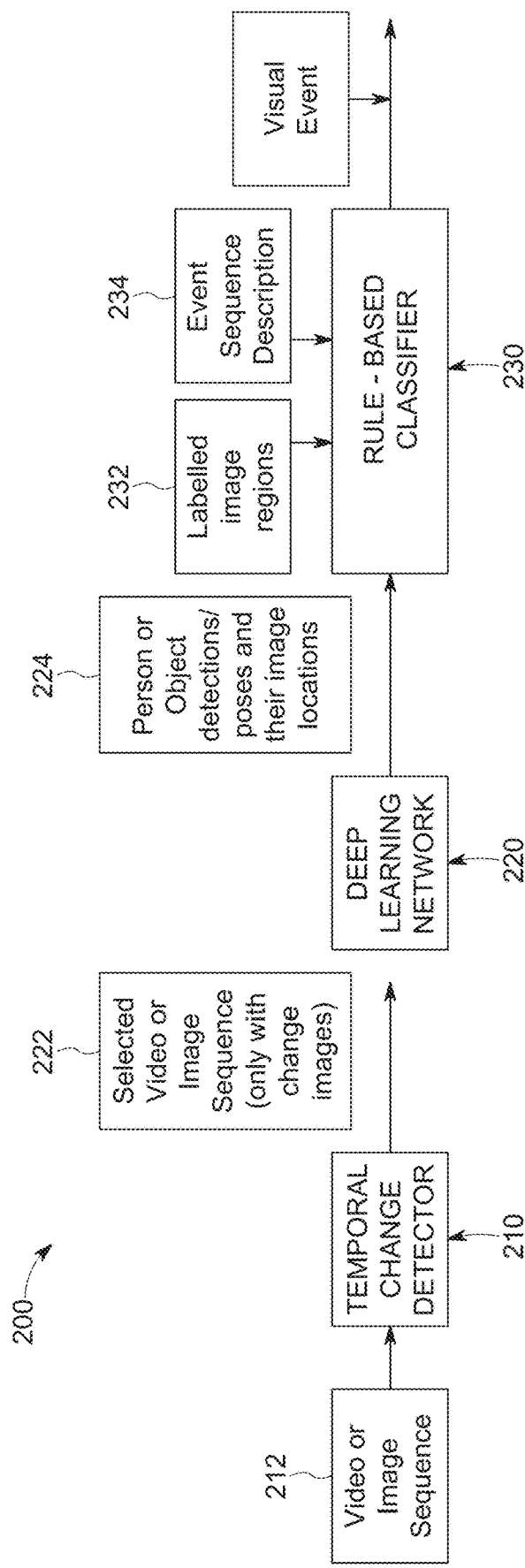
FIG. 2 is a block diagram showing an overview of a hybrid visual detector according to an illustrative embodiment.

Reference is made to FIG. 2, which shows an overall representation of a hybrid visual detector 200 used for marine and equivalent transportation-based applications according to an exemplary implementation. The depicted detector 200 consists of three primary functional modules 210, 220 and 230.

The temporal change detector 210 processes full framerate raw video input or an appropriate image sequence 212 from at least one camera and produces as output sampled video output of scenes with activity and moving objects. However, broadly stated, the existence of signal of interest can be detected by the presence of an object as well as motion thereof (i.e. free of object movement). Other triggers for possible detection can be derived from (e.g.) other types of sensors, a timer, and/or interleaved input from multiple cameras.

The depicted, exemplary detector 210 in FIG. 2 is characterized by low computational and development cost and reduces video bandwidth (as described generally above) to the deep-learning detector by up to 1000×. In addition to desirable bandwidth reduction, in which useful signal image frames are parsed from extraneous, idle frames, the output includes the temporal information of the signal to be used for stream processing/complex event processing (thereby providing the clock of the system).

As shown further in FIG. 2, a generic deep-learning visual detector 220 receives as input sampled video 222 and produces, as an output localized, classified, people and objects 224. This detector has high computational, but low development cost due to its generic structure. A rule-based classifier 230 then receives object and person classifications from the deep learning network (not in video form) 230 as inputs and locations and poses (from the deep learning network 230 if available) 224. The classifier 230 also receives pre-trained labelled image regions 232, and partially detected visual events and/or an event sequence description 234. Desirably, this detector also has low computational and low development cost.

It is noted that additional modules can be provided optionally to the general flow of FIG. 2. For example, it can also include a spatial detector/processor and/or a CEP/stream processor. Similarly, as described generally above, (FIGS. 1C-1E) the flow can include feedback in the form of control and configuration data.

Figure 3:
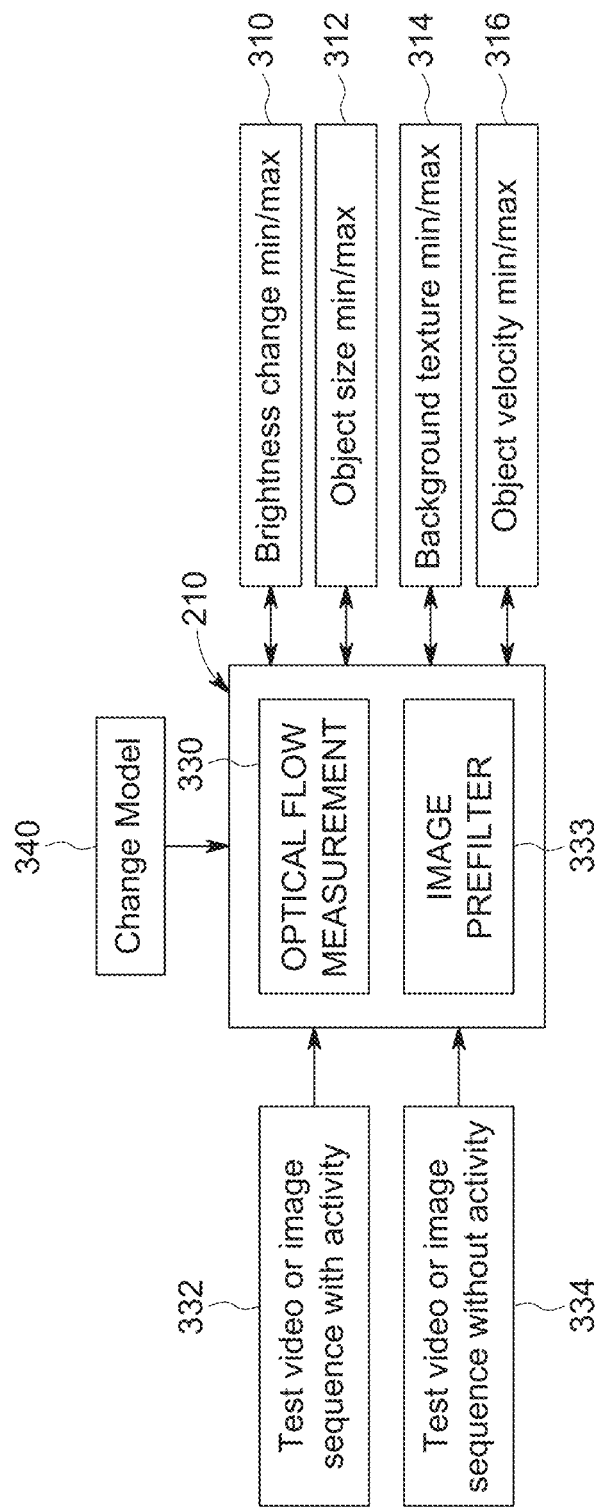
FIG. 3 is a block diagram showing the structure and function of the temporal change detector process (or) for the hybrid visual detector of FIG. 2 in further detail.

With reference to FIG. 3, the operation of the temporal change detector 210 in a training/development mode is shown in further detail. The change detector 210 itself can be implemented as an optical flow measurement block 330 parameterized by minimum and maximum object size 312 and/or minimum/maximum brightness change 310. The detector 210 receives test image frames sequences and/or video with activity 332 and without (free-of) activity 334. Any integrated change in a test frame sequence/video that is less than a threshold (min) of brightness or greater than a threshold (max) of brightness and less than a minimum object size (min) is suppressed by the detector's operational process. Background texture 314 is also provided with a min/max threshold, in addition to object velocity 316. By way of example, an open source algorithm is the Lukas-Kanade method implemented in the open source library OpenCV which also includes GPU optimization from NVIDIA. Additionally, the change detector 210 can include image pre-filters 333 for removing variable, non-essential background, such as (e.g.) ocean wave texture or slowly changing cloud texture or sky texture changes. It is anticipated that the change detector be "leaky," that is at some interval say at every 20 or 30 seconds, a frame of video leaks through even when no temporal change is detected. This will allow an (e.g.) unmoving person or object to be detected (and re-detected) every 20 or 30 seconds or at a selectable interval. The training process for a given change model 340 involves selecting appropriate values for brightness 310, size 312 and texture 314, and leak time parameters.

Figure 3A:
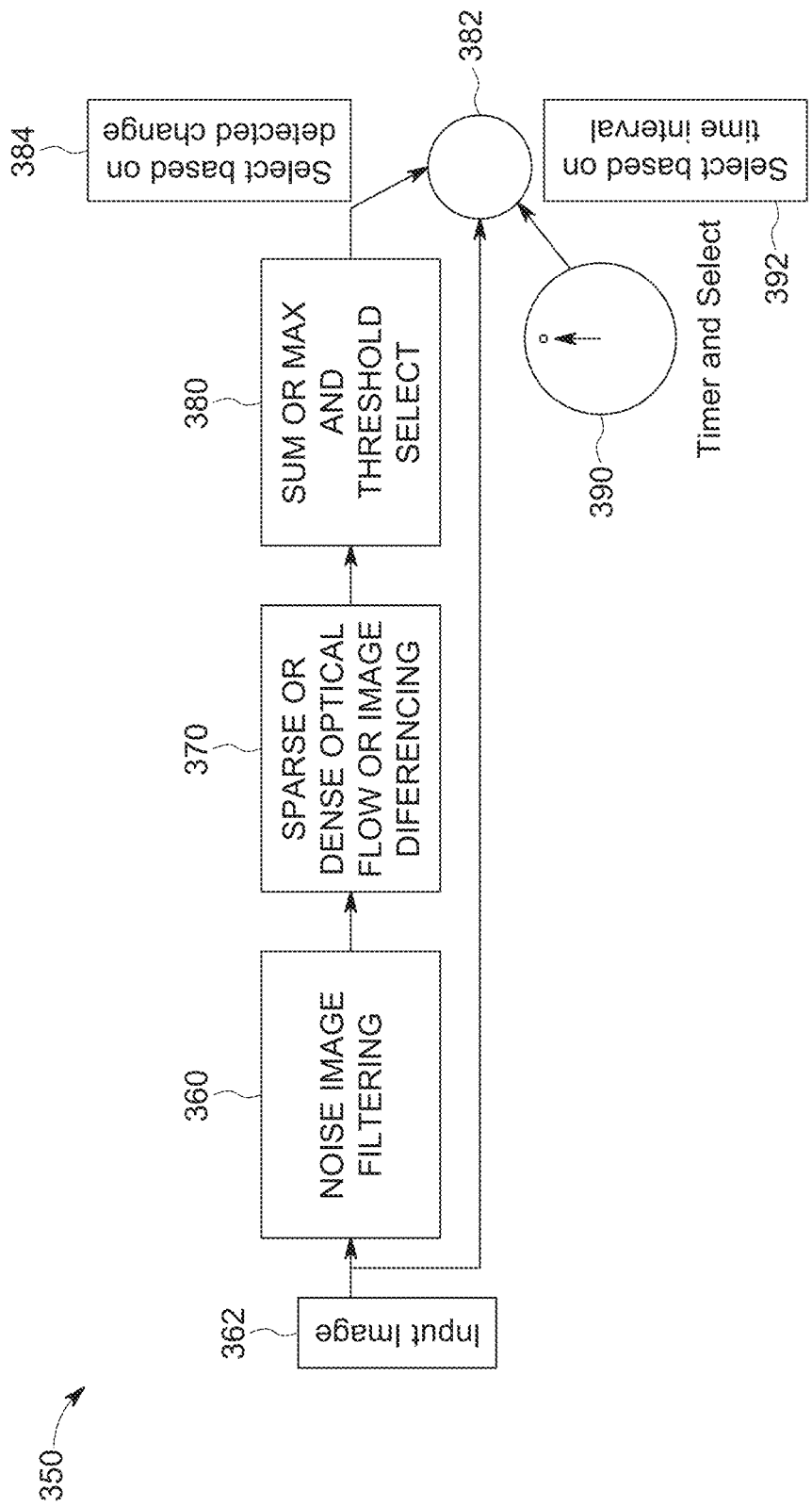
FIG. 3A is block diagram showing a more detailed operational flow for the change detector of FIG. 3.

Reference is further made to FIG. 3A, which shows a more detailed operational procedure 350 for the change detector 210 described above. Note that optional noise filtering 360 can be applied to remove noise from the scene of input image data 362, such as glare or window reflections or camera shake. The optional noise filtering 350 can also be arranged to reduce image resolution or convert the image from color to monochrome. Filtered data is directed to an optical flow or image differencing block 370, which can find changes in the image over time. This block 370 can operate at multiple scales. The data from the flow/differencing block 370 is then directed to a sum or max threshold operator 380 that either sums or picks the maximum of changes or flows in the image and thresholds the result. The output 382 is a yes/no that change was present in the image and the image should be selected 384. As shown, part of the selection entails providing the input image data 362 directly to the output 382. Images 362 can also be selected (392) from output 382 primarily/exclusively based upon a timer 390, and not based on the change detector function. Thus, images are periodically selected based upon elapsed time (or another appropriate time-based criteria) in addition, or instead of, motion. Thus, as described herein images 362 are selected by the change detector arrangement either due to detected changes/motion in the image OR due to parameters that are set/acted upon by a timer or another appropriate external trigger, sensor and/or alarm such as a fire alarm.

Figure 4:
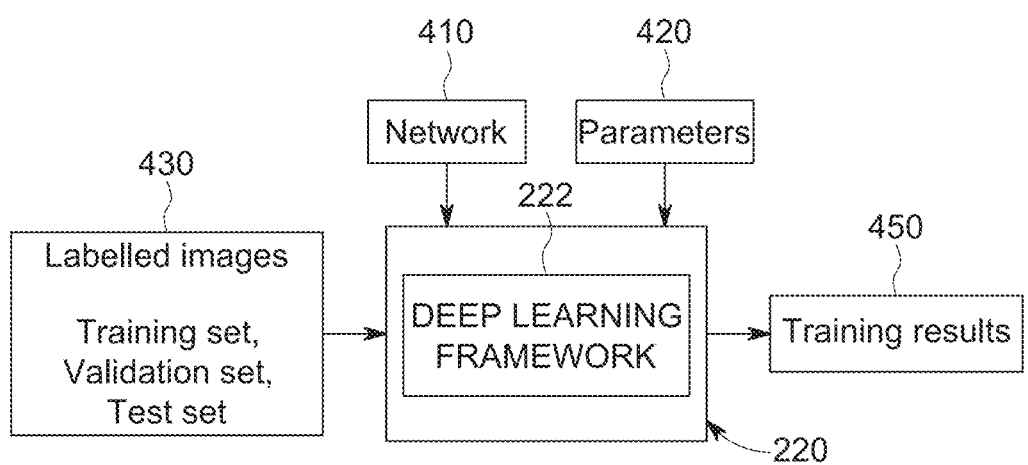
FIG. 4 is a block diagram showing the structure and function of the deep learning network of the hybrid visual detector of FIG. 2 in further detail.

With reference to FIG. 4, the training of the deep-learning visual detector 220 is shown in further detail. By way of non-limiting example, the deep-learning-based module can use various deep-learning framework(s) 222, such as caffe, tensorflow, torch, pytorch, keras and/or the OpenCV software toolkit. The network 410 associated with the detector 224 can be a mask R-CNN (region-based convolutional neural network) or Faster R-CNN or Keypoint-RCNN or Yolov3 detector. Various parameters 420 are automatically or manually supplied to the framework to adjust the training process. By way of useful background, see https://engineer.dena.com/posts/2019.05/survey-of-cutting-edge-computer-vision-papers-human-recognition/. The image training data for such a network consists of a combination of public domain images and customer images 430 that can be labelled appropriately. Training results 450 are thereby provided by the detector 220.

Figure 5:
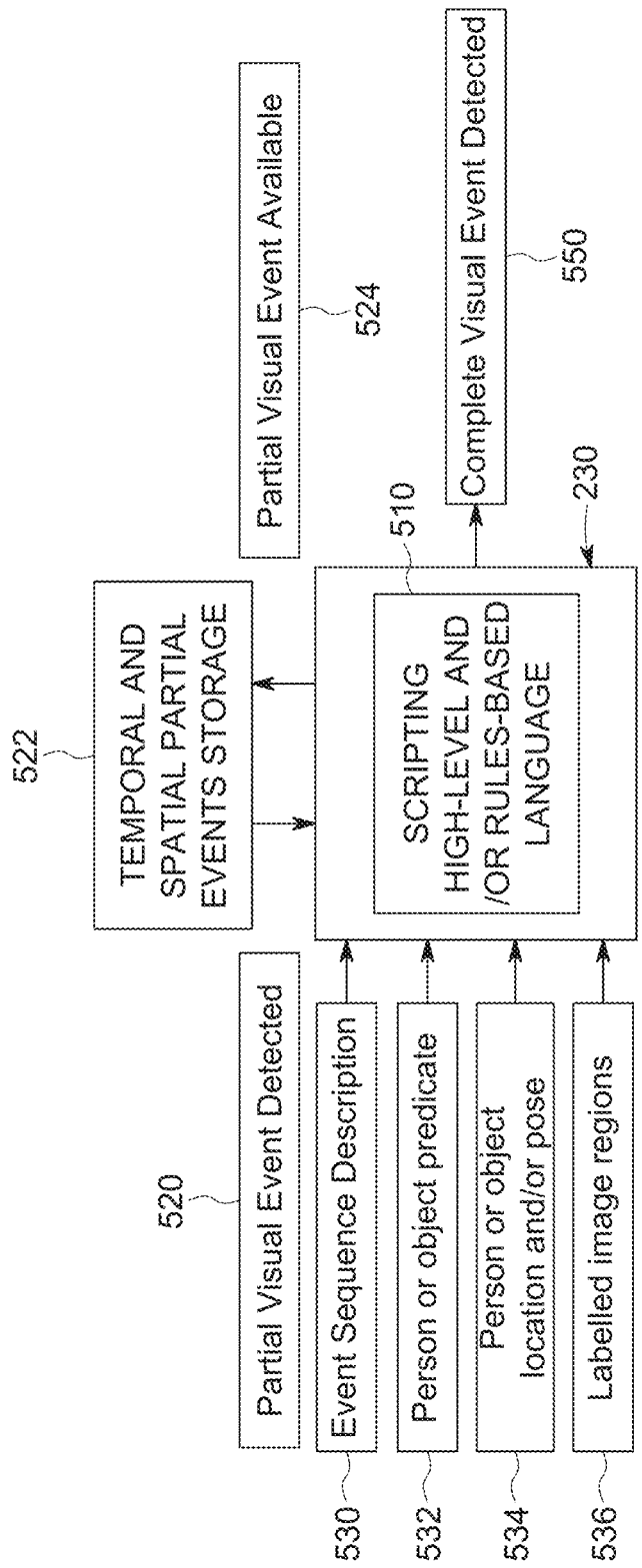
FIG. 5 is a block diagram showing the development/training flow for the above-described rule-based classifier of the hybrid visual detector of FIG. 2 in further detail.

FIG. 5 shows the development/training flow for the above-described rule-based classifier 230. By way of non-limiting example, the rule-based classifier 230 can be implemented in a scripting language like javascript, a high-level language (510), such as publically/commercially available python, or a rule-based language, such as Prolog or Wolfram Language. The rules typically take the form of IF 'condition' THEN 'result' where the 'result' can be a partially completed event that can be detected 520 and held in temporal and spatial partial events storage 522, from which events are made available for processing 524. The partially completed event can be implemented in a scripting language or a high-level language using a py.transition, for example. The classifier 230 further receives as its inputs, an event sequence description 530, a person or object predicate 532, the person or object location and/or pose 534 and labelled image regions 536. The classifier 230 thereby outputs a detected, complete visual event 550.

In operation, the classifier receives output from the deep-learning vision detectors that report on what has been detected such as a person, or an object (such as a tool or motor), or a boat/vessel, and the additional information from the deep-learning vision detectors on where in the particular image that detection took place, and possibly pose information (how exactly the person is standing or the object is positioned in space). It either directly converts that output into an alert or more typically using mathematical logic, combines it with additional information such as the expected detection/location/pose and duration of the output to form the specific alert.

It is recognized that a deep learning model typically occupies significant memory resources (on the order of several gigabytes). In order to run at video frame rate for a single camera, multiple, e.g., eight (8) commercially available NVidia GPU's, may be required. However, the system and method described herein, and run on the processing arrangement 150 and associated computing platform(s) 130 and 142 of FIG. 1, advantageously allows this large memory requirement (and other associated computing resource requirements) to be reduced. By way of example, it the expectation is that each video channel in the detection arrangement can reduced by up to 1000×, allowing a single processor and (e.g.) one NVidia GPU to process the video stream generated by ten (10) cameras.

V. Operational Examples

By way of non-limiting example, the above-described system and method can operate in a variety of instances.

A. Event Examples

1. An example of a crew behavior visual event is that crew members are performing expected activities on the bridge of the vessel such as navigation at the expected time and the event also includes a reported location, start time, end time and elapsed time.
2. An example of crew safety visual event is an alert that the crew members are wearing hard-hats when required to do so by their assigned activity.
3. An example of a ship maintenance visual event is an alert that engine oil is being added to the engine at an appropriate time.
4. An example of a ship environment visual event is an alert that another vessel is in the vicinity.
5. An example of an active cargo monitoring visual event is an alert that the crew members have performed an inspection round on the cargo.

B. Further Examples of Maritime Visual Events Reported by the System

1. A person is present at their station at the expected time and reports the station, start time, end time, and elapsed time.
2. A person has entered a location at the expected time and reports the location, start time, end time, and elapsed time
3. A person moved through a location at the expected time and reports the location, start time, end time, and elapsed time
4. A person is performing an expected activity at the expected location at the expected time and reports the location, start time, end time, and elapsed time. The activity could be watching, monitoring, installing, hose connecting or disconnecting, crane operating, tying with ropes.
5. A person is running, slipping, tripping, falling, lying down, using or not using handrails at a location at the expected time and reports the location, start time, end time, and elapsed time.
6. A person is wearing or not wearing protective equipment when performing an expected activity at the expected location at the expected time and reports the location, start time, end time, and elapsed time. Protective equipment could be a hard-hat, left or right glove, left or right shoe/boot, ear protection, safety goggles, life-jacket, gas mask, welding mask, or other protection.
7. A door is open or closed at a location at the expected time and reports the location, start time, end time, and/or elapsed time
8. An object is present at a location at the expected time and reports the location, start time, end time and elapsed time. The object could be a gangway, hose, tool, rope, crane, boiler, pump, connector, solid, liquid, small boat or unknown.
9. Normal operating activities are being performed using engines, cylinders, hose, tool, rope, crane, boiler, and/or pump.
10. Maintenance activities are being performed on engines, cylinders, boilers, cranes, steering mechanisms, HVAC, electrical, pipes/plumbing, and/or other systems.

C. Operational Example

Figure 6:
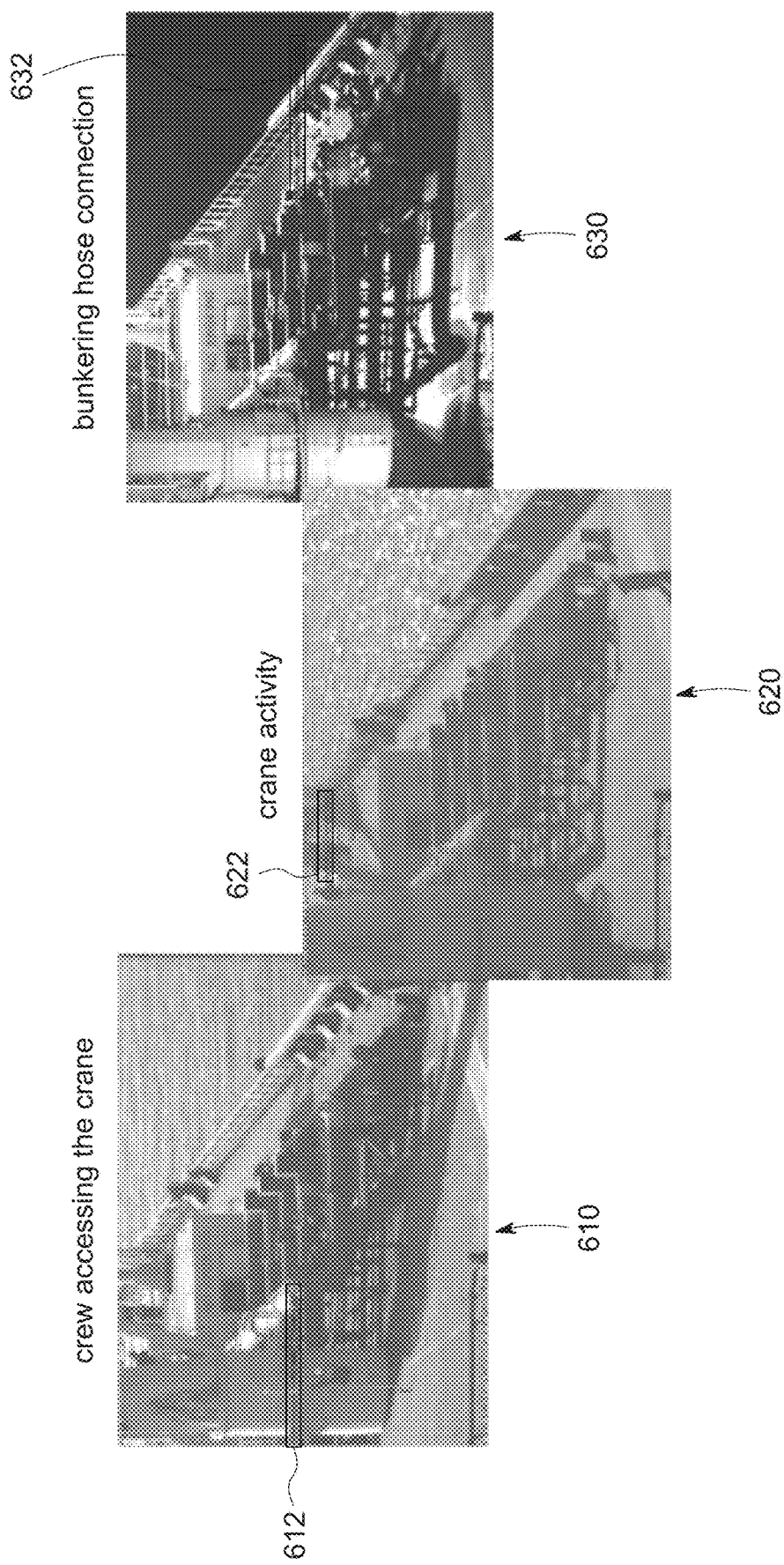
FIG. 6 is a diagram showing three exemplary images of potential events on the deck of an exemplary vessel that can be detected using the system and method herein.

FIG. 6 shows three, non-limiting, exemplary images of activity on a vessel deck. Image 610 shows a crew member acing a deck and is characterized as such (612) in the image. Image 620 shows crane activity and is characterized as such (622). Likewise, image 630 shows a bunkering hose connection, and is characterized as such (632).

Figure 7:
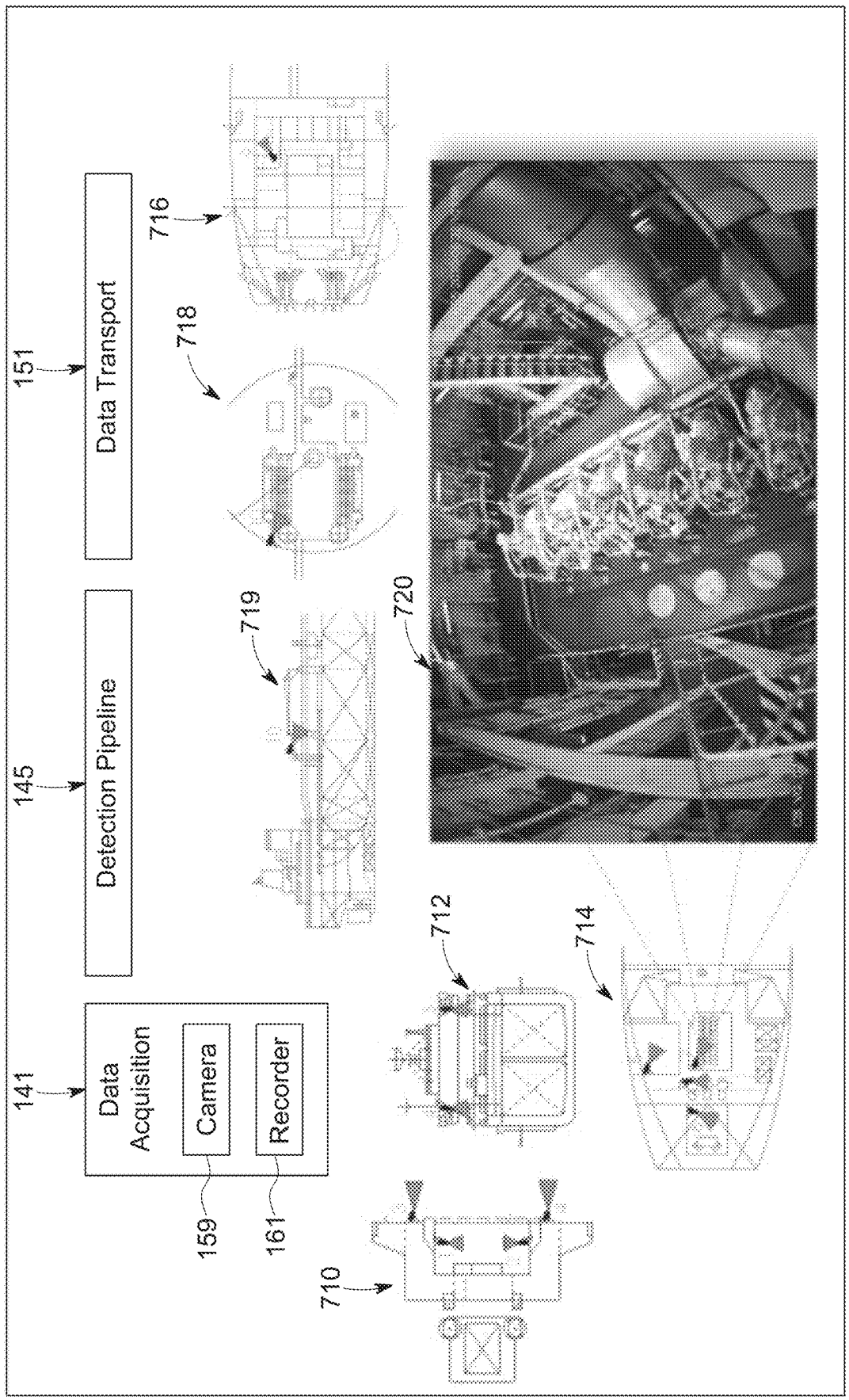
FIG. 7 is a block diagram showing an exemplary image acquisition process and associated functions for performing event detection, according to the system and method herein.

Referring again to the functional blocks for data acquisition 141, detection pipeline 145 and data transport 151 shown in FIGS. 1C-1E above, an example of data acquisition is shown in FIG. 7. Note that ten exemplary (10) cameras 1-10 are located variously within respective (shown in partial hull-cutaway) parts 710, 712, 714, 716, 718 and 719 of the exemplary vessel. Exemplary camera 7 is shown acquiring an image 720 of the internals of the engine room. This is part of the image data transmitted from the data acquisition block 141 to the detection pipeline 145.

Figure 8:
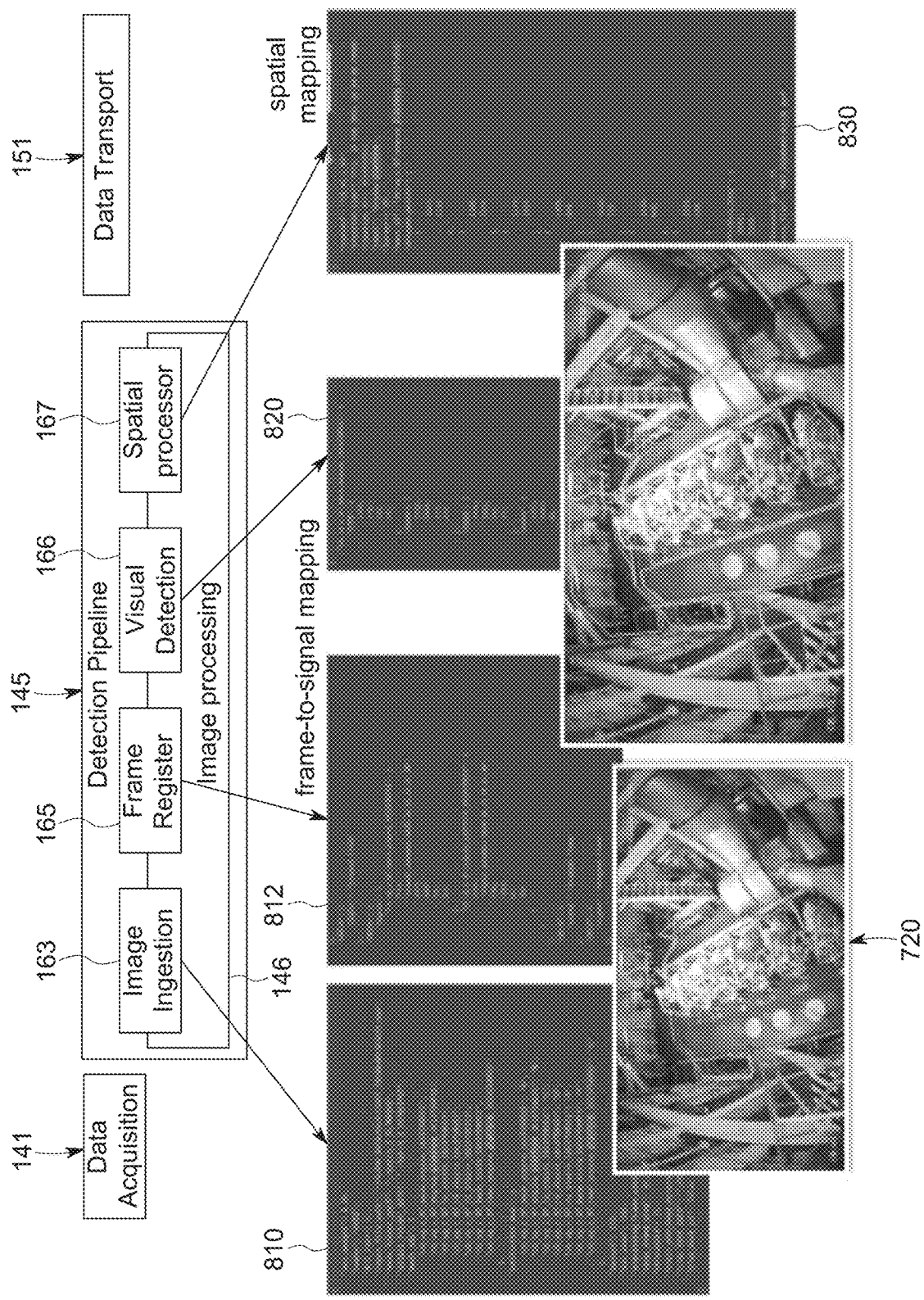
FIG. 8 is an exemplary visual event detection process and associated functions operating on the acquired image of FIG. 7, according to the system and method herein.

In FIG. 8, code 810, 812 (respectively) for related image ingestion 163 and the frame register 165 are shown in association with the acquired image 720 (FIG. 7). Visual detection processes 166, which can be based upon the above-described hybrid detection procedures, yield associated code 820. Likewise, the spatial processor 167 yields spatial mapping code 830.

Figure 9:
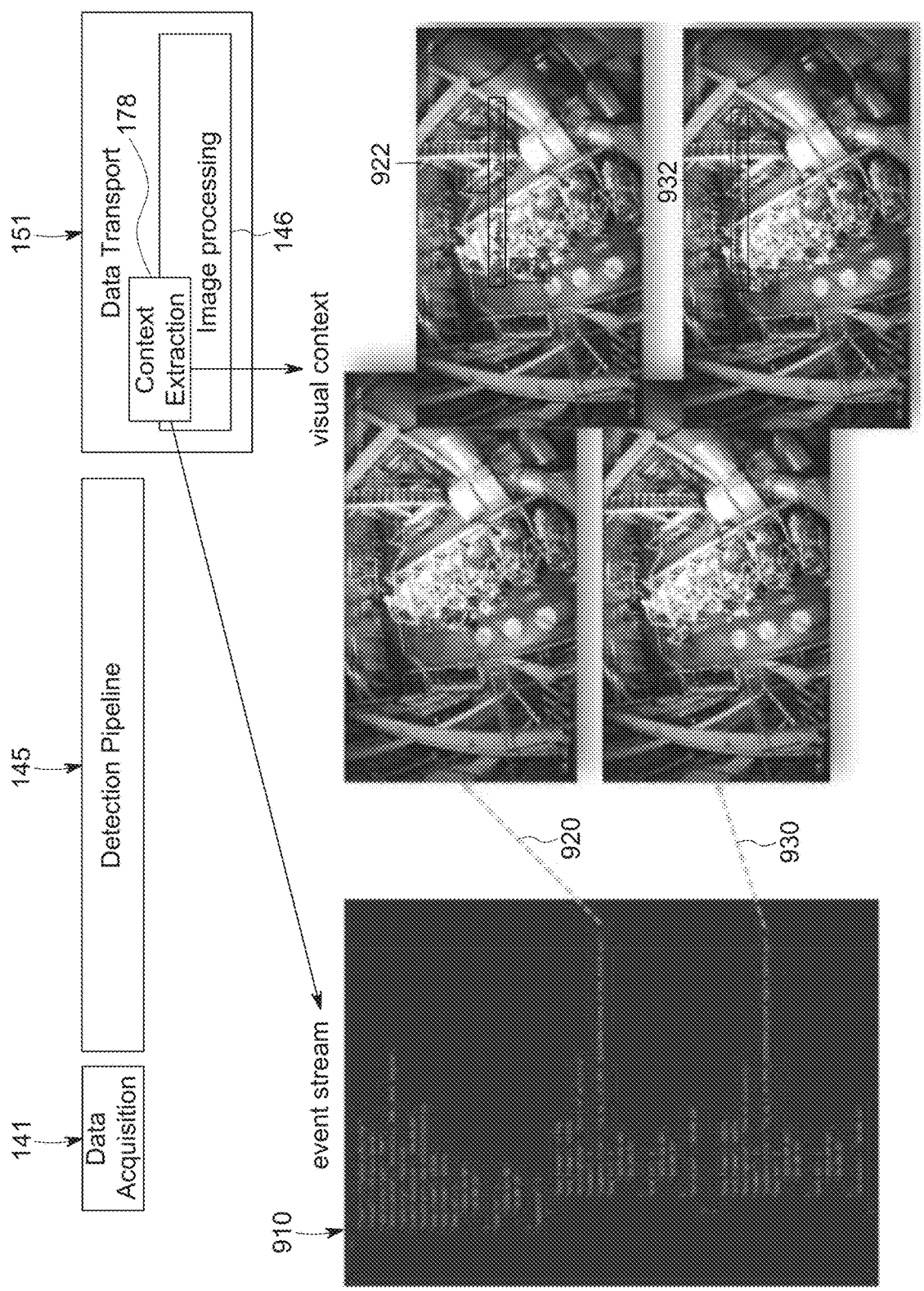
FIG. 9 is an exemplary data transport process and associated functions operating on the acquired image of FIG. 7, in which visual events are detected according to FIG. 8 in the system and method herein.

FIG. 9 shows operation of the data transport block 151 in the above example in which an event stream code 910 is generated by the context extraction process 178. Various event codes 920, 930 map to respective visual events that are flagged 922, 932 (respectively) in the (e.g. engine room) image(s). For example, events 922 and 932 highlight to presence of activity in the form of a person attending the engine at differing locations.

Figure 10:
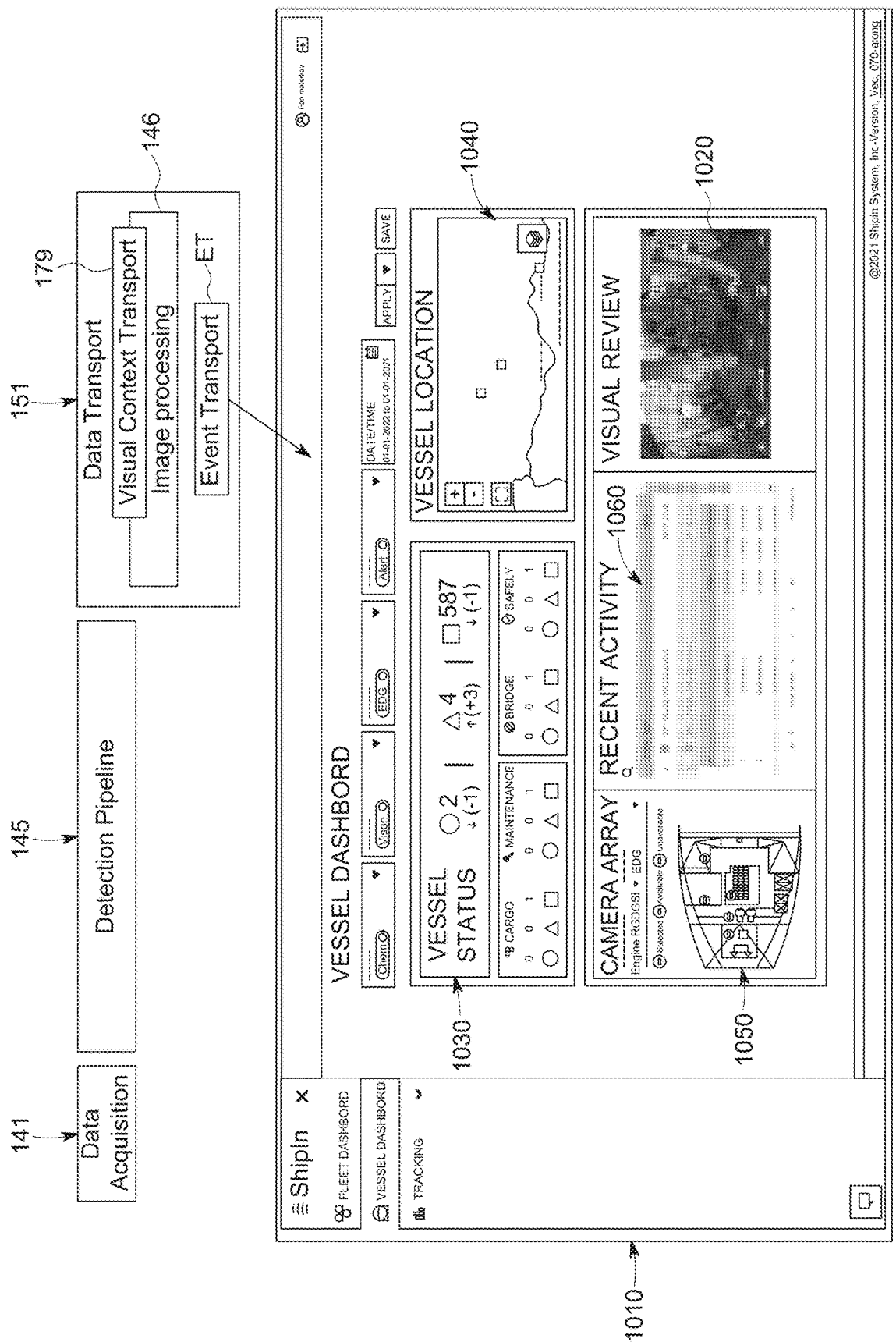
FIG. 10 is an exemplary data transport process and associated functions operating on the acquired image of FIG. 7, in which an exemplary dashboard of a vessel is populated with event and status information according to FIG. 8 in the system and method herein.

With reference to FIG. 10, the exemplary event depicted in FIG. 9 is further handled by the data transport block 151, using the visual context transport process 179 and the event transport process ET to generate a vessel-based, or remote-location-based, event status page in the GUI 1010, which defines the system dashboard for the particular vessel. Such events are described in further detail in the above-incorporated U.S. patent application Ser. No. 17/175,364, and include, by way of non-limiting example, an image or video clip 1020 of the event, status indicators 1030, global location map and position 1040, camera location (on the vessel) 1050 and summary of recent activity 1060. Note that the dashboard can include a variety of useful data on various events and status items in addition to those depicted herein.

To aid in understanding the types of detector building blocks available, the following are non-limiting examples of various Activities, Events, Sequences and GUI Activities that can be employed in the system and method herein.

The following Table lists exemplary activities in a maritime environment.

| # | activity_id | scene-field_of_view | metric |
|---|---|---|---|
| 1 | d3d_scene_round_steering_room | steering_room | start_time duration end_time |
| 2 | d3d_scene_round_main_engine | main_engine | start_time duration end_time |
| 3 | d3d_scene_round_deck_port_view | deck_port_view | start_time duration end_time |
| 4 | d3d_scene_round_deck_stb_view | deck_stb_view | start_time duration end_time |
| 5 | d3d_scene_round_generator | generator | start_time duration end_time |
| 6 | d3d_equipment_inspection_bridge_port_view | bridge_port_view | start_time duration end_time |

The following tables list series of exemplary events and their characteristics/characterization in the system and method herein operating in a maritime environment.

| # | d2d_id | summary |
|---|---|---|
| 1 | d2d_presence_in_polygon | person in polygon |
| 2 | d2d_presence_at_station | person standing at station |
| 3 | d2d_interaction_equipment | person interacting with equipment |
| 4 | d2d_inspection_equipment | person inspecting equipment |
| 5 | d2d_compartment_access | person entering compartment |
| 6 | d2d_compartment_access_segment | person entering compartment (segmentation based) |

| # | description | in |
|---|---|---|
| 1 | iterating over a list of bounding boxes, gets a bounding box for a detected person, and a polygon, returns TRUE if the bounding box (person) is within the polygon, FALSE otherwise | d1d_person |
| 2 | iterating over a list of keypoint vectors, gets a keypoint vector for a detected person, and a polygon-station, returns TRUE if the detected person is pose-standing and their feet keypoints are within polygon-station , FALSE otherwise | d1d_keypoint |
| 3 | iterating over a list of keypoint vectors, gets a keypoint vector for a detected person, and a polygon-equipment, returns TRUE if the detected person is pose-interacting and their hand keypoints are within polygon-equipment, FALSE otherwise | d1d_keypoint |
| 4 | iterating over a list of keypoint vectors, gets a keypoint vector for a detected person, and a polygon-equipment, returns TRUE if the detected person is pose-facing and their feet keypoints are within polygon-station, FALSE otherwise | d1d_keypoint |
| 5 | iterating over a list of bounding boxes, gets a bounding box for a detected person, a line, and a previous state of the stream, returns TRUE if the detected person has crossed the line in the access direction, FALSE otherwise | d1d_person |
| 6 | | d1d_segment_person |

| # | out | metric | in (1_out) | function |
|---|---|---|---|---|
| 1 | bounding_box_list stream_id boolean_list | timestamp people_count | bounding_box_list stream_id | in_polygon:polygon-general |
| 2 | keypoint_vector_list stream_id boolean_list | timestamp people_count | keypoint_vector_list stream_id | at_polygon:polygon-station estimate_pose:pose-standing |
| 3 | keypoint_vector_list stream_id boolean_list | timestamp people_count | keypoint_vector_list stream_id | in_polygon:polygon-equipment estimate_pose:pose-interacting |
| 4 | | timestamp people_count | keypoint_vector_list stream_id | |
| 5 | bounding_box stream_id boolean_list | timestamp people_count | bounding_box_list stream_id | line_crossed:line-access |
| 6 | contour_list stream_id boolean_list | timestamp people_count | stream_id contour_list | line_crossed:line-access |
| 7 | bounding_box stream_id boolean_list | timestamp people_count | bounding_box_list stream_id | line_crossed:line-exit |
| 8 | bounding_box_list stream_id boolean_list | timestamp people_count | bounding_box_list stream_id | in_scene:scene-field_of_view |
| 9 | bounding_box_list stream_id boolean_list | timestamp people_count | bounding_box_list stream_id | line_crossed:line-access |
| 10 | bounding_box_list stream_id boolean_list | timestamp people_count | bounding_box_list stream_id | line_crossed:line-access |
| 11 | keypoint_vector_list stream_id boolean_list | timestamp people_count | keypoint_vector_list stream_id | estimate_pose:pose-facing |

-continued

| # | out | metric | in (1_out) | function |
|---|---|---|---|---|
| 12 | keypoint_vector_list stream_id boolean_list | timestamp people_count | keypoint_vector_list stream_id | estimate_pose:pose-standing |
| 13 | keypoint_vector_list stream_id boolean_list | timestamp people_count | keypoint_vector_list stream_id | estimate_pose:pose-interacting |

| # | function_operator | function_parameter | function_out |
|---|---|---|---|
| 1 | in_polygon | polygon-general | boolean_list |
| 2 | at_polygon estimate_pose | polygon-station pose-standing | boolean_list boolean_list |
| 3 | in_polygon estimate_pose | polygon-equipment pose-interacting | boolean_list boolean_list |
| 4 | | | |
| 5 | line_crossed | line-access | boolean_list |
| 6 | line_crossed | line-access | boolean_list |
| 7 | line_crossed | line-exit | boolean_list |
| 8 | in_scene | scene-field_of_view | boolean_list |
| 9 | line_crossed | line-access | boolean_list |
| 10 | line_crossed | line-access | boolean_list |
| 11 | estimate_pose | pose-facing | boolean_list |
| 12 | estimate_pose | pose-standing | boolean_list |
| 13 | estimate_pose | pose-interacting | boolean_list |

| # | used by: 3 UI ACTIVITIES | UI ACTIVITIES copy |
|---|---|---|
| 1 | d3d_scene_round_middle | |
| 2 | d3d_equipment_inspection_start d3d_equipment_maintenance d3d_equipment_operation_start d3d_equipment_maintenance d3d_equipment_operation_end d3d_equipment_inspection_end d3d_station_presence_start d3d_station_presence_middle d3d_station_presence_end | |
| 3 | d3d_equipment_maintenance d3d_equipment_operation_middle | |
| 4 | d3d_equipment_inspection_middle | |
| 5 | d3d_scene_round_start | d2d_compartment_access_b |
| 6 | | |

The following table lists a series of exemplary sequences of events activities relevant to a marine environment.

| # | sequence_step | summary | EVENT (from 2) |
|---|---|---|---|
| | d3d_id: d3d_equipment_inspection | | |
| 1 | d3d_equipment_inspection_start | equipment inspection | d2d_presence_at_station |
| 2 | d3d_equipment_inspection_middle | equipment inspection | d2d_inspection_equipment |
| 3 | d3d_equipment_inspection_end | equipment inspection | d2d_presence_at_station |
| | d3d_id: d3d_equipment_maintenance | | |
| 4 | d3d_equipment_maintenance_start | equipment maintenance | d2d_presence_at_station |
| 5 | d3d_equipment_maintenance_middle | equipment maintenance | d2d_interaction_equipment |
| 6 | d3d_equipment_maintenance_end | equipment maintenance | d2d_presence_at_station |
| | d3d_id: d3d_equipment_operation | | |
| 7 | d3d_equipment_operation_start | equipment operation | d2d_presence_at_station |
| 8 | d3d_equipment_operation_middle | equipment operation | d2d_interaction_equpment |
| 9 | d3d_equipment_operation_end | equipment operation | d2d_presence_at_station |
| | d3d_id: d3d_scene_round | | |
| 10 | d3d_scene_round_start | single-scene round | d2c_compartment_access |
| 11 | d3d_scene_round_middle | single-scene round | d2d_presence_in_polygon |
| 12 | d3d_scene_round_end | single-scene round | d2d_compartment_exit |
| | d3d_id: d3d_station_presence | | |
| 13 | d3d_station_presence_start | person at station | d2d_presence_at_station |
| 14 | d3d_station_presence_middle | person at station | d2d_presence_at_station |
| 15 | d3d_station_presence_end | person at station | d2d_presence_at_station |

| # | function_parameter (from 2) | # of repetitions | order | condition | value |
|---|---|---|---|---|---|
| 1 | polygon-station pose-standing | single | start | TRUE_duration | >1 sec |
| 2 | polygon-station pose-standing | single | middle | TRUE_duration | >10 sec |
| 3 | polygon-station pose-standing | single | end | FALSE_duration | >5 sec |
| 4 | polygon-station | single | start | TRUE_duration | >5 sec |

-continued

| # | function_parameter (from 2) | # of repetitions | order | condition | value |
|---|---|---|---|---|---|
| 5 | pose-standing polygon-equipment pose-interacting | single | middle | TRUE_duration | >10 sec |
| 6 | polygon-station pose-standing | single | end | FALSE_duration | >5 sec |
| 7 | polygon-station pose-standing | single | start | TRUE_duration | >5 sec |
| 8 | polygon-equipment pose-interacting | multiple | middle | TRUE_duration | >10 sec |
| 9 | polygon-station pose-standing | single | end | FALSE_duration | >5 sec |
| 10 | line-access | single | start | boolean_detection | TRUE |
| 11 | polygon-general | multiple | middle | TRUE_duration | >1 sec |
| 12 | line-exit | single | end | boolean_detection | TRUE |
| 13 | polygon-station pose-standing | single | start | TRUE_duration | >1 sec |
| 14 | polygon-station pose-standing | multiple | middle | TRUE_duration | >5 sec |
| 15 | polygon-station pose-standing | single | end | FALSE_duration | >5 sec |

| # | metric | description | ACTIVITIES 3 |
|---|---|---|---|
| 1 | start_time | Person standing by equipment and facing it, observing it | d3d_equipment_inspection bridge_por |
| 2 | duration | Person standing by equipment and facing it, observing it | d3d_equipment_inspection bridge_por |
| 3 | end_time | Person standing by equipment and facing it, observing it | d3d_equipment_inspection bridge_por |
| 4 | start_time | Person interacting with equipment in a way that implies maintenance . . . | |
| 5 | duration | Person interacting with equipment in a way that implies maintenance . . . | |
| 6 | end_time | Person interacting with equipment in a way that implies maintenance . . . | |
| 7 | start_time | Person interacting with equipment | |
| 8 | duration | Person interacting with equipment | |
| 9 | end_time | Person interacting with equipment | |
| 10 | start_time | Person traversing a path within a scene, beginning and finishing at . . . | d3d_scene_round steering_room d3d_scene_round main_engine d3d_scene_round deck_port_view d3d_scene_round deck_stb_view d3d_scene_round generator |
| 11 | duration | Person traversing a path within a scene, beginning and finishing at . . . | d3d_scene_round steering_room d3d_scene_round main_engine d3d_scene_round deck_port_view d3d_scene_round deck_stb_view d3d_scene_round generator |
| 12 | end_time | Person traversing a path within a scene, beginning and finishing at . . . | d3d_scene_round steering_room d3d_scene_round main_engine d3d_scene_round deck_port_view d3d_scene_round deck_stb_view d3d_scene_round generator |
| 13 | start_time | person staying for significant time at station | |
| 14 | duration | person staying for significant time at station | |
| 15 | end_time | person staying for significant time at station | |

The following table lists a series of exemplary User Interface activities relevant to a marine environment.

| # | ui_activity_id | scene | metric (from 2 EVENTS) |
|---|---|---|---|
| 1 | d2d_presence_in_compartment_bridge_port_view | bridge_port_view | timestamp people_count |
| 2 | d2d_compartment_access_bridge_port_view | bridge_port_view | timestamp people_count |
| 3 | d2d_compartment_exit_bridge_port_view | bridge_port_view | timestamp people_count |

It should be clear that the foregoing tables represent examples of operation examples that are relevant to a particular marine environment and can be varies for use in different environments.

A further option detection process contemplated herein relates to detection of a hazard that the bridge lights are on while the vessel is underway at night. By way of analogy, a similar hazard occurs in a vehicle at night if the lights in the car cabin are on. If so, the driver loses night vision accommodation, and is unable to see well outside in the dark. At night, seafarers on the bridge who are supposed to be on watch or lookout cannot do their jobs properly if the lights are on in the bridge. Often muted red lights and/or instrument panel lights are substituted for full illumination of the bridge space and its surroundings at night.

The detection software employs, as decision-making inputs, a satellite-based Automatic Identification (AIS) signal that the vessel is underway and not in port or at anchor, and also determines the GPS ship coordinates. In this manner, the detection process can estimate when is nighttime as defined by sunrise/sunset or more precisely when is 30 minutes after dusk and 30 minutes before dawn which depends on the exact location of the ship on the globe. It also employs the UTC time from the ship's clock to know if it is nighttime based on that GPS location. All of these inputs are used by the process to correlate whether it is nighttime (within a predetermined fixed or variable threshold of dusk/dawn) at the current time/latitude/longitude. This is then compared to an indicia of whether lights are on/off. In an example, two vision algorithms/processes are employed to estimate if the lights are on, including (1) using the camera as an absolute light meter measuring the light coming into the camera on the bridge with a threshold and (2) using the camera as a relative light measurement device looking at the distribution of gray values by the histogram of the scene where we look for bright objects corresponding to an illuminated object or light fixture. The detection is reported as positive (e.g. bridge lighting at night is on when underway) if all of these tests pass simultaneously. If so, an alert is issued.

VI. Conclusion

It should be clear that the above-described system and method for allowing the hybrid detection of events using both deep learning and code-based algorithms provides an efficient and effective mechanism for identifying visual events in a remote environment, such as a ship, where computing and communication bandwidth resources can be limited. The events can be highly variable and involve both personnel and equipment, as well as cameras and other appropriate sensors.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software-based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for detecting visual events in a transportation environment having one or more locations of interest in which the events occur comprising:
   a plurality of cameras arranged to image each of a plurality of activities relevant to the transportation environment, in which each camera of the plurality of cameras respectively acquires images of a location of interest and transmits image data thereof to a processor; and
   a visual detector associated with the processor arranged to include,
   (a) at least one visual change detector that identifies changes between at least two of the images,
   (b) at least one pre-trained visual deep learning model operating on at least an individual frame of images exclusively transmitted based on the identified changes, and generating a deep learning inference output associated with at least one person or object depicted at least in part in the individual frame, and
   (c) at least one rule-based classifier that produces events or alerts from the deep learning inference output associated with the at least one person or object, and that is trained with at least one rule facilitating safe, rule-conforming operation of at least one of crew behavior, crew safety, ship maintenance, ship environment, or active cargo monitoring.

2. The system as set forth in claim 1 wherein the processor comprises one or more CPUs or one or more GPUs.

3. The system as set forth in claim 1 wherein the visual change detector includes at least one of a data filter, an optical flow processor or image differencer block, and a sum or max threshold operator.

4. The system as set forth in claim 3 wherein the optical flow processor or image difference operates at multiple scales.

5. The system as set forth in claim 3 wherein the visual detector operates on image 2 sequences with or free-of activity.

6. The system as set forth in claim 5 wherein the visual change detector is adapted to operate based upon a change in brightness, a threshold of object size, a threshold of texture or a threshold of object velocity.

7. The system as set forth in claim 1 wherein the deep learning model comprises at least one of a single stage detector, YOLO, SSD, a multistage detector, RCNN, FasterRCNN, a segmentation network, MaskRCNN, a segmentation network from an open source library, and a segmentation network from at least one of OpenCV and Detectron2.

8. The system as set forth in claim 1 wherein the deep learning model is adapted to operate based upon at least one of a deep learning and machine learning framework, Cafe, Tensorflow, Pytorch, and Keras.

9. The system as set forth in claim 1 wherein the rule-based classifier operates based upon an event sequence description, the deep learning inference output including a person or object predicate, a person or object location, a person or object pose, and a labelled image region.

10. The system as set forth in claim 1 wherein the rule-based classifier operates on stored temporal and spatial partial events to generate a complete visual event.

11. The system as set forth in claim 1 wherein the visual change detector includes a clock output.

12. The system as set forth in claim 1 wherein the visual change detector includes an external trigger and a timer that provides image frames to downstream detection processes based upon a predetermined time interval.

13. The system as set forth in claim 1 wherein the rule-based classifier receives 2 regions of interest as an input.

14. The system as set forth in claim 1 wherein the rule-based classifier is based upon a detected and localized person, a region of interest and an event sequence.

15. The system as set forth in claim 14 wherein, at least one of, (a) the person is a crew on a vessel, (b) the region of interest is a location on the vessel, and (c) the event sequence, is an operation related to the vessel.

16. The system as set forth in claim 1 wherein the cameras and the visual detector are arranged to determine a present time and location in the transportation environment and compare the time and location to detection of lighting so as to alert of improper lighting at the time and location.

17. A method for detecting visual events in a transportation environment having one or more locations of interest in which the events occur comprising the steps of:
 imaging each of a plurality of activities relevant to the transportation environment with a plurality of cameras, wherein each camera of the plurality of cameras respectively acquires images of a location of interest and transmits image data thereof to a processor; and
 providing a visual detector associated with the processor that performs the steps of,
  (a) identifying changes between at least two of the images,
  (b) operating at least one pre-trained visual deep learning model on at least an individual frame of images exclusively transmitted based on the identified changes to generate at least one deep learning inference output associated with at least one person or object depicted at least in part in the individual frame, and
  (c) producing, with at least one rule-based classifier events or alerts from the deep learning inference output associated with the at least one person or object, the classifier trained with at least one rule facilitating safe, rule-conforming operation of at least one of crew behavior, crew safety, ship maintenance, ship environment, or active cargo monitoring.

18. The method as set forth in claim 17 wherein the visual change detector includes at least one of a data filter, an optical flow processor or image differencer block, and a sum or max threshold operator.

19. The method as set forth in claim 17 wherein the rule-based classifier operates based upon at least one of an event sequence description, a person or object predicate, a person or object location, a person or object pose, and a labelled image region.

20. The method as set forth in claim 17 wherein the rule-based classifier operates on stored temporal and spatial partial events to generate a complete visual event.

21. The method as set forth in claim 17 wherein the rule-based classifier is based upon a detected and localized person, a region of interest and an event sequence, and at least one of, (a) the person is a crew on a vessel, (b) the region of interest is a location on 4 the vessel, and (c) the event sequence, is an operation related to the vessel.

22. A system for detecting visual events in a transportation environment having one or more locations of interest for the visual events, the system comprising:
 a plurality of cameras arranged to image each of a plurality of activities relevant to the transportation environment, in which each camera of the plurality of cameras respectively acquires images of a location of interest and transmits image data thereof to a processor; and
 a visual detector associated with the processor arranged to include,
  (a) at least one visual change detector that initiates exclusive transmission of a portion of the images based on a trigger derived from an expected time associated with the plurality of activities,
  (b) at least one pre-trained visual deep learning model operating on at least an individual frame of the images exclusively transmitted, and generating a deep learning inference output associated with at least one person or object depicted at least in part in the individual frame, and
  (c) at least one rule-based classifier that produces events or alerts from the deep learning inference output associated with the at least one person or object, and that is trained with at least one rule defining at least one of an expected detection, expected location in the frame, or expected pose of the at least one person or object and a duration thereof, the at least one rule facilitating safe, rule-conforming operation of at least one of crew behavior, crew safety, ship maintenance, ship environment, or active cargo monitoring.

23. The system of claim 22, wherein the trigger is further derived from interleaved input from at least two of the plurality of cameras.

24. The system of claim 22, wherein the trigger is further derived from an alarm associated with a non-visual event.

25. The system of claim 22, wherein the at least one rule facilitates producing an alert based on a lack of an expected activity at the expected time.

* * * * *